United States Patent [19]
Akao et al.

[11] Patent Number: 5,358,785
[45] Date of Patent: Oct. 25, 1994

[54] LAMINATED FILM AND PROCESS FOR PRODUCING THE SAME

[75] Inventors: Mutsuo Akao; Hiroyuki Osanai; Makoto Kawamura, all of Kanagawa; Koji Nakai, Shizuoka, all of Japan

[73] Assignee: Fuji Photo Film Co., Ltd., Minami-ashigara, Japan

[21] Appl. No.: 888,845

[22] Filed: May 27, 1992

[30] Foreign Application Priority Data

May 28, 1991 [JP] Japan ............... 3-123964
Jun. 3, 1991 [JP] Japan ............... 3-131056
Jun. 17, 1991 [JP] Japan ............... 3-171615
Dec. 19, 1991 [JP] Japan ............... 3-337194
Dec. 19, 1991 [JP] Japan ............... 3-337200

[51] Int. Cl.$^5$ ............................... B32B 7/12
[52] U.S. Cl. ................. 428/349; 428/35.7; 428/417; 428/516; 428/913
[58] Field of Search ........... 428/500, 516, 913, 35.7

[56] References Cited

U.S. PATENT DOCUMENTS 3,904,465  9/1975  Haase et al.
4,070,222  1/1978  Olson.

FOREIGN PATENT DOCUMENTS 027798A   8/1988  European Pat. Off.
369447    5/1990  European Pat. Off.
50-77493  6/1975  Japan.
WO 83/01926 6/1983 PCT Int'l Appl.
1392841   4/1975  United Kingdom.
2208824   4/1989  United Kingdom.
2221869   2/1990  United Kingdom.

Primary Examiner—Edith Buffalow
Attorney, Agent, or Firm—Burns, Doane, Swecker & Mathis

[57] ABSTRACT

Laminated films laminated by blocking characterized in that the cut end is joined by heat fusion, the inner layer contains a thermoplastic resin having a Shore hardness lower than the resin of the outer layer, the inner layer comprises an acid-modified polyolefin resin, the joined portion by blocking comprises strongly joined portions and weakly joined portions, the end portions are joined more strongly than the central portion, and a process for producing the same. The laminated films are stably laminated by blocking and do not separate through the laminating process and the bag-making process.

17 Claims, 10 Drawing Sheets

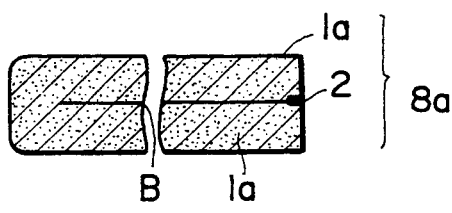
F I G. 1
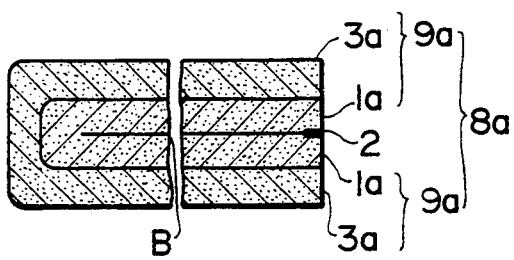
F I G. 2
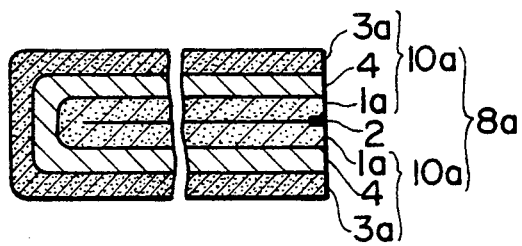
F I G. 3
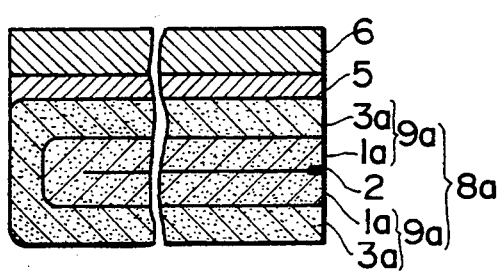
F I G. 7
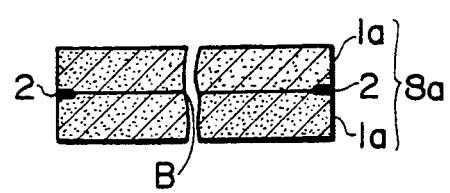
F I G. 4
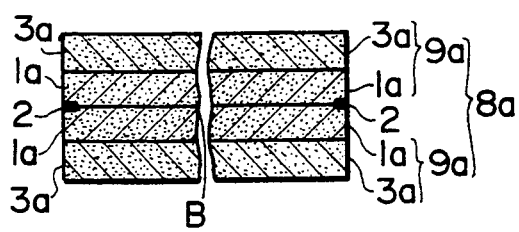
F I G. 5
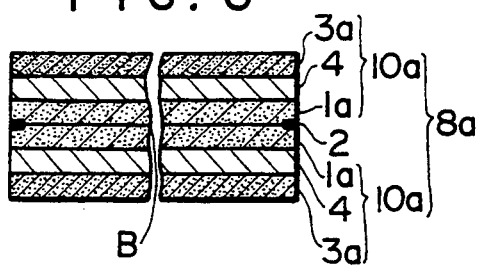
F I G. 6
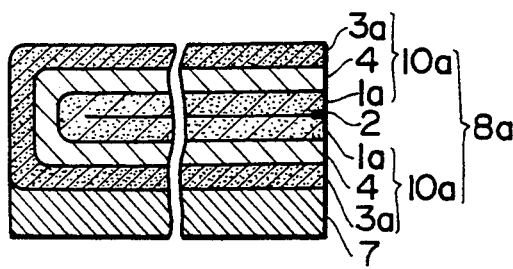
F I G. 8 ing various patterns of the strongly joined portions and

LAMINATED FILM AND PROCESS FOR PRODUCING THE SAME

BACKGROUND OF THE INVENTION

This invention relates to laminated films joined by blocking and processes for producing the same.

As the packaging material used for the packaging bags of photographic photosensitive materials, laminated films consisting of a plurality of film layers are used, and the plurality of the film layers are laminated through an adhesive layer or directly by extrusion laminating. The laminated films are produced through many laminating processes which increase manufacturing cost, and tend to curl. Moreover, tear strength is small.

The inventors disclosed a novel laminated film laminated not by adhesive or extrusion laminating but by blocking in a soft state to a certain degree U.S. Pat. No. 4,981,734, EP 0,369,447A). The laminated films laminated by blocking have a great tear strength, Gelbo test strength and impact puncture strength, and curling does not occur. However, the pseudo-adhesion by blocking is unstable, and laminated films were occasionally separated from a cut end at temperatures. The pseudo-adhesion was also occasionally separated partially in the laminating process with other flexible sheets or in the bag-making process, resulting in the occurrence of wrinkling, furrowing or blistering troubles. These troubles became a problem in winter and in strongly air-cooled room.

SUMMARY OF THE INVENTION

An object of the invention is to provide a laminated film laminated by blocking in a suitable strength which does not separate, for example, through the laminating process and the bag-making process, irrespective of seasons, when it is produced in the normal conditions.

Another object of the invention is to provide a laminated film laminated by blocking wherein the pseudo-adhesion does not vary with film thickness, temperature variation due to seasonal variation, cooling efficiency by air, etc.

The present invention provides laminated films and processes for producing them which have achieved the above objects.

Thus, the present invention provides:
A laminated film comprising an inflation film of which the inner surface is joined by blocking and the cut end is joined by heat fusion.
A process for producing the above laminated film which comprises pressing a tubular film molded by an inflation process by a pressure roll into a flat form to join the inner surface by blocking, and then cutting by fusion.
A process for producing a laminated film which comprises heating the surface of a tubular film molded by an inflation process, and then pressing the tubular film by a pressure roll into a flat form to join the inner surface by blocking.
A laminated film comprising a coextruded multilayer inflation film of which the inner surface is joined by blocking, wherein the Shore hardness (ASTM D-2240) of the thermoplastic resin comprising the inner layer is lower than the thermoplastic resin comprising the outer layer.
A laminated film comprising a coextruded multilayer inflation film of which the inner surface is joined by blocking, wherein the inner layer comprises an acid-modified polyolefin resin.
A laminated film comprising two thermoplastic resin films of which the inner surfaces are joined by blocking, wherein the joined portion comprises strongly joined portions and weakly joined portions.
A process for producing the above laminated film which comprises pressing two thermoplastic resin films by an embossing roll.
A laminated film which is laminated by blocking, wherein the end portions are joined more strongly than the central portion.
A process for producing the above laminated film which comprises pressing a film laminated by blocking in a linear form with a prescribed width, and then cutting the pressed portion.

BRIEF DESCRIPTION OF THE DRAWINGS

FIGS. 1 through 15 are partial sectional views of a laminated film embodying the invention.

DETAILED DESCRIPTION OF THE INVENTION

Figure 9:
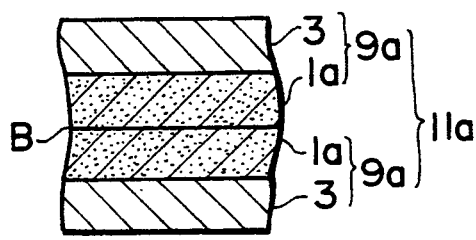

To Join by blocking means that deflated (in the specification, "deflated" means "rendered flat by passing over a pressure roll") inner surface of inflation film is joined without using an adhesive and heat fusion.

The blocking is allowed to occur by passing the nip roll of an inflation film molding machine with weakening cooling conditions, by passing a pressure roll composed of a heating metal roll and an elastic roll, such as a heat-resistant rubber roll or a cotton roll before being entirely cooled, or the like. The pressing form includes the entire face pressing, spot pressing, pressing in longitudinal streaks, pressing in lattice pattern, pressing in lateral streaks, pressing in other embossed patterns. The metal roll may be flat or provided with various embossing, such as spots, streaks, lattice, cloth mark, or other embossed patterns, e.g. more than 210 patterns are disclosed in "BEALON SHIBO (Crimp)" (published by NGK Bealon Corp. Ltd.)

It is preferred to heat the tubular film before blocking by the nip roll or pressure roll. When the inner surface of the inflation film is heated, it can be conducted by heating the mandrel. When the outer surface of the inflation film is heated, it can be conducted by using a far-infrared heater in a ring form, blowing hot air, using nichrome wire heaters in a ring form, using a heating bar in a ring form, or the like. The above heaters may be composed of a plurality of commercial linear heaters. A preferred heating temperature renders the inner surface of the inflation film to around the softening point, in view of not degrading the appearance of the film outer surface and obtaining a suitable strength adhesion by blocking. The heating temperature, therefore, depends upon film molding speed, film thickness, the resin composition, etc. For example, in the case that the inner surface is composed of L-LDPE resin, the heating is conducted so that the temperature of the inner surface becomes more than 40° C., preferably 50° to 140° C., more preferably 60° to 120° C.

The inflation film may be either of a single layer film or a multilayer film. In the case of a single layer film, it is necessary to provide a temperature difference between the inner surface and the outer surface. The temperature difference may be formed at the ring die or by air-cooling the outer surface alone.

It is preferred to provide strongly joined portions and weakly joined portions in the joined portion by blocking. A suitable peel strength of the strongly joined portions is not less than twice, preferably not less than three times, particularly preferably not less than five times, that of the weakly joined portions. When the peel strength of the strongly joined portions is less than that of the weakly joined portions, not only there is a possibility that the pseudo-adhesion does not occur at the weakly joined portions in winter and strongly air-cooled room, but also the pseudo-adhesion at the strongly joined portions is reduced. As a result, the separation at the pseudo-adhesion and wrinkling occur in the laminating process of other flexible sheets or in the bag-making process. In order to induce none of the above problems, to improve physical strength, such as tear strength, to prevent curling and to improve flexibility, a suitable peel strength of the strongly joined portion, is 2 to 250 g/15 mm width, preferably not more than 100 g/15 mm width, more preferably not more than 50 g/15 mm width. When the peel strength is more than 200 g/15 mm width, at the strongly joined portions, the inner surfaces are joined substantially in a heat fusion state, and the laminated film tends to tear at the boundary between the strongly joined portion and the weakly joined portion. Moreover, at the strongly joined portion, flexibility and Gelbo test strength decreases, and pinholes tend to occur. When the peel strength is less than 2 g/15 mm width, the joined portion by blocking tends to be separated similar to the conventional laminated film laminated by blocking. A suitable peel strength of the weakly joined portion is not more than 150 g/15 mm width, preferably not more than 50/15 mm width, more preferably not more than 20 g/15 mm width. The lower limit is 0.01 g/15 mm width, preferably 0.1 g/15 mm width. A suitable interval between the strongly joined portion and weakly joined portion is 1 to 100 mm, preferably 2 to 50 mm. When the interval is less than 1 mm, the laminated film is similar to that laminated by the strongly joined portion entirely. As a result, to ensure flexibility and physical strength of the laminated is difficult, and wrinkling and streaks tend to occur. When the interval exceeds 100 mm, the laminated film is similar to that laminated by the weakly joined portion entirely, and similar problems to the conventional laminated film laminated by blocking occur. The form of the strongly joined portions may be spots, streaks, lattice, or the like.

The strongly joined portion may be provided at the end portions to form a laminated film wherein the end portions are joined more strongly than the central portion. The end portion to be joined by the strongly joined portion is, for example in the case of a rectangular film, not necessary to be all of four ends, and it is sufficient to join at least two paralleled sides by the strongly joined portion. Besides, when one end is folded, it is sufficient to join the other end in parallel to the folding end by the strongly joined portion. The peel strength of the strongly joined portion is preferably not less than 20 g/15 mm width, more preferably not less than 50 g/15 mm width, particularly not less than 150 g/15 mm width. The peel strength of the weakly joined portion is preferably not more than 150 g/15 mm width, more preferably not more than 50 g/15 mm width, particularly preferably not more than 20 g/15 mm width.

The strongly joined portions and weakly joined portions can be formed by the method of indenting the inner surface and/or outer surface of a single layer or multilayer inflation, e.g. by processing the ring die and then pressing by a smooth surface pressure roll, the method of using a cooling apparatus having ribs at constant intervals in the longitudinal direction, and pressing by a pressure roll having ribs at constant intervals in the lateral direction (see Example 13), the method of using an embossing roll as the nip roll of a single layer or multilayer inflation film molding machine, the method of joining the inner surface of the deflated single layer or multilayer inflation film entirely by the weakly joined portion by passing a nip roll, and then forming indentations by passing an embossing roll provided behind the nip roll to form the strongly joined portions (see Examples 11 and 12). A preferred method comprises joining the inner surface of the deflated single layer or multilayer inflation film by blocking, heating the film laminated by blocking by a heater, such as a hot air heater or a far-infrared heater, and then pressing by an embossing roll. The heating temperature by the heater is lower than the melting point, preferably the softening point, of the inflation film. When the heating temperature exceeds the melting point, not only the flatness of the inflation film is degraded, but also the outer surface layers facing each other formed by winding the inflation film are also joined by blocking. As a result, unwinding of the roll of the inflation film is difficult, and breakage of the inflation film occurs.

In the case of the laminated film wherein the end portions are joined more strongly than the central portion, the strongly joined portion can be formed by pressing by a pressure roll or a heating roll, and the strength of the strongly joined portion is controlled by adjusting pressure, temperature, etc. Cutting of the strongly joined portion may be conducted before or after the formation of the strongly joined portion. For example, a laminated film laminated by blocking is pressed in a linear form with a prescribed width by a pressure roll to form the strongly joined portion, and then the strongly joined portion is cut to obtain a laminated film having the strongly joined portions at the ends. The laminated film by blocking is preferably produced from an inflation film by deflating, but may be produced by superimposing two films separately molded and then joining by blocking. The separately molded films may be identical with or different from each other in resin composition, molding method, such as inflation process, T die method or casting method, thickness, color and layer construction. When packaging bags are made of the above laminated film, the strongly joined portion is preferably utilized as the sealing end.

As the method for joining the cut end of the laminated by heat fusion, laser beam cutting, ultrasonic cutting, flame cutting, electric discharge cutting, heated rotary blade cutting, heated razor blade cutting and the like are usable. Among them, the heated razor blade cutting is preferred, in view of inexpensive equipment cost and the ease of width change. A suitable temperature is around the Vicat softening point (ASTM D-1525) of the inner layer, actually 50° C. to the melting point, preferably 70° to 150° C., more preferably 80° to 120° C.

Heretofore, the edge trimming and slitting into a prescribed width of a continuously traveling film web are conducted by slitting the film by a fixed blade at a free traveling portion between conveying rollers, slitting by a combination of a fixed blade and a rotary blade (e.g. Japanese Patent KOKAI No. 64-58492), slitting by a combination of a rotating roll with channels and fixed blades, slitting by a traveling rotary blade which travels with rotating along a fixed blade, slitting by laser beam.

The slitting by the fixed blade is cheap and excellent in workability. However, in the case of elevating the traveling speed of the film or sliting a flexible polyolefin resin film containing carbon black which has a great tear strength and elongation, various troubles occur, such as wrinkling at the free traveling portion, difficulty in slitting or breakage of the film. Particularly, when the film to be slitted is used for a laminated film, unless incision is good, it tends to break the web. Besides, in the case of slitting a film composed of a linear low density polyethylene (L-LDPE) resin containing carbon black, which is flexible, great in tear strength in the longitudinal direction and liable to elongate, for a long period, the contact portion of the fixed blade with the film is locally heated resulting in the reduction of sharpness of the blade. Therefore, it is necessary to change the blade about every two days. The degeneration of cuttings in quantity is also a problem. The cuttings and dust suspended in air adhere to the film, and entrained into the film roll. As a result, they induce indentations or projections by pressing film layers, or remain in a fixed state to the film.

The slitting by the combination of a fixed blade and a rotary blade is excellent in good incision of photographic films magnetic tape films and the like and a small quantity of cuttings. However, the apparatus is expensive and requires a lot of time for adjusting the upper blade and the lower blade. Moreover, it is not suitable for slitting various films made of various resins which are cheap and different in thickness and molecular orientation, such as packaging films, particularly the films being flexible, great in tear strength and liable to elongate, such as polyolefin resin films containing carbon black.

The slitting by a combination of a rotating roll with channels and fixed blades is preferred in a wide utilization because of cutting with stretching in the width direction on the surface of the roll with channels. However, the life of the blade is short similar to the above fixed blade, and it is necessary to change the blade about every two days while the film molding line is stopped. Moreover, means for cleaning cuttings is necessary, because cuttings are generated.

The slitting by a traveling rotary blade is applicable for cutting or slitting papers or the like in a limited length, but it is impractical for slitting a traveling film web.

The slitting by laser beam is restricted in utilization in view of the manufacturing speed, cost, maintenance, safety, etc., although the generation of cuttings is prevented.

However, the aforementioned heated razor blade cutting is excellent, particularly in slitting a film being flexible, great in tear strength and liable to elongate, such as a polyolefin resin film containing carbon black, i.e. few cuttings, long blade life, high productivity, incision with a high strength, rare breakage of slit polyolefin resin film, etc. The heated razor blade cutting is also applicable to various films not laminated by blocking. The incision slit by the heated razor blade is thickened compared with before slitting.

The inflation film of which the inner surface is joined by blocking may be a single layer film or a coextruded multilayer film. In the case of a single layer film, preferred resins composing the film are those suitable for the inner layer of the coextruded multilayer film.

Preferable inflation films are coextruded multilayer films wherein the resin composing the inner layer which is joined by blocking is different from the resin composing the outer layer wherein blocking does not occur. Preferred resins used for the inner layer are ethylene copolymer resins, propylene copolymer resins, thermoplastic resin elastomers, such as ethylene-propylene copolymer rubber and ethylene-proylene-diene ternary copolymer rubber, thermoplastic resins containing a tackifier, modified polyolefin resins (acid-modified polyolefin resins), etc., having a low softening point and excellent physical strength. The thermoplastic resins containing a low polymerization degree, such as polyolefin resin having a mean molecular weight of 300 to 7,000, and the thermoplastic resins containing a tackifier, such as rosin resin, terpenephenol resin, petroleum resin, cumarone-indene resin, styrene resin, phenol resin, etc. are preferable in order to ensure pseudo-adhesion by blocking. It is preferred that the inner layer contains at least one of the above resins in an amount of more than 50 wt. % in total of the above resins. Particularly preferred resins are polyolefin resins containing more than 50 wt. % in total of the ethylene-$\alpha$-olefin copolymer resin and/or ethylene-vinyl acetate copolymer resin having a Vicat softening point lower than the outer layer by 5° C. or more, because of obtaining a laminated film stable in pseudo-adhesion by blocking and excellent in physical strength. Other suitable resins include low density homopolyethylene resin and medium.high density homopolyethylene resin.

Suitable ethylene copolymer resins are ethylene-vinyl acetate copolymer resin, ethylene-propylene copolymer resin, ethylene-1-butene copolymer resin, ethylene-butadiene copolymer resin, ethylene-vinyl chloride copolymer resin, ethylene-methylmethacrylate copolymer resin, ethylene-methyl acrylate copolymer resin, ethylene-ethyl acrylate copolymer (EEA) resin, ethylene-acrylonitrile copolymer resin, ethylene-acrylic acid copolymer resin, ionomer resin (copolymer of ethylene and unsaturated acid crosslinked using metal such as zinc), ethylene-α-olefin copolymer (L-LDPE) resin, ethylene-propylene-butene-1 ternary copolymer resin, and the like. Among the above ethylene copolymer resins, L-LDPE resin and EEA resin are preferred, because they are excellent in film moldability and heat sealing properties and are great in bag rupture strength, impact puncture strength and tear strength. L-LDPE resin is particularly preferred.

In order to adjust the properties as necessary, it is preferred to blend with other thermoplastic resins, elastomers, rubbers, various additives or modifiers.

The L-LDPE resin is called third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferable α-olefins have 4-10 carbon atoms, and examples of the α-olefin are butene-1, 4-methylpentene-1, hexene-1, heptene-1 and octene-1. The density is usually in the range of 0.87 to 0.95 g/cm$^3$, and the melt index in usually 0.1 to 50 g/10 minutes. Most of the L-LDPE resin is synthesized by low pressure method, and partly synthesized by modified high pressure method. Examples of commercial L-LDPE resin are "G-Resin" and "TUFLIN" and "NUC-FLX" (UCC), "NUC Polyethylene-LL" and "TUFTHENE" (Nippon Unicar) "Excelene VL" (Sumitomo Chemical), "Idemitsu Polyethylene-L" and "Moretec" (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Mitsubishi Polyethy-LL" (Mitsubishi Petrochemical), "Stamilex" (DSM), and the like. Preferable L-LDPE resins are copolymers of ethylene and α-olefin of which the number of carbon atoms is 6 to 8 having a melt index (MI) of 0.8 to 10 g/10 minutes (ASTM D-1238) and a density of 0.870 to 0.940 g/cm$^3$ (ASTM D-1505) manufactured by liquid process or vapor process. Very low density L-LDPE resins having a density of less than 0.910 g/cm$^3$ are also preferred.

The EEA resin is not restricted, and commercial EEA resins have, for example, a comonomer content of 7 to 41%, a MI of 1.5 to 1500 g/10 minutes (ASTM D-1238), a density of 0.93 to 0.95 g/cm$^3$ (ASTM D-1505) a brittle temperature of $-40°$ C. to less than $-75°$ C. (ASTM D-746) and a tensile strength of 14 to 160 kg/cm$^2$ (ASTM D-638).

A preferable coextruded multilayer inflation film has the iner layer containing a thermoplastic resin having a Shore hardness (ASTM D-2240) lower than the thermoplastic resin of the outer layer. A suitable Shore hardness of the thermoplastic resin having a lower Shore hardness contained in the inner layer is lower than 60 D, preferably 10 to 50 D in view of ensuring pseudo-adhesion by blocking, flexibility and Gelbo test strength. The Shore hardness is preferably lower than the thermoplastic resin of the outer layer by 2 D or more, particularly 5 D or more. Suitable thermoplastic resins for the inner layer are polyolefin copolymer resins, such as acid-modified polyolefin resin, L-LDPE resin, EEA resin and EVA resin.

Another preferable coextruded multilayer inflation film has the inner layer containing an acid-modified polyolefin resin.

The acid-modified polyolefin resin is an modified polyolefin resin which is a polyolefin resin modified by grafting an unsaturated carboxylic acid compound, and includes graft-modified polyethylene resin, graft-modified polypropylene resin, graft-modified ethylene copolymer resin and graft-modified poly-α-olefin resin such as graft-modified ethylene-ethylacrylate copolymer resin, graft-modified ethylene-vinyl acetate copolymer resin, graft-modified polybutene-1 resin and graft-modified poly-4-methylpentene-1 resin. A preferable grafting rate is 0.01 to 10%.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, end-cis-bicyclo[2,2,1]-hepto-5-en-2,3-dicarboxylic acid, maleic anhydride, itaconic anhydride, citraconic anhydride, aconitic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monomethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide maleimide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and maleic anhydride is particularly preferred. A suitable amount of the unsaturated carboxylic acid compound is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKAI No. 50-77493. Among them, the melting method using an extruder is preferred because of simple operation and inexpensiveness.

A peroxide is added in order to accelerate the reaction between the polyolefin base resin and the unsaturated carboxylic acid. Suitable peroxides are organic peroxides such as benzoyl peroxide, lauroyl peroxide, dicumyl peroxide, α,α'-bis(t-butylperoxydiisopropyl)-benzene, 2,5-dimethyl-2,5-di(t-butylperoxy)hexane, 2,5- dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Suitable peroxides are di-t-butylperoxide, dicumylperoxide, 2,5-dimethyl-2,5-di(t-butylperoxy)hexane, 2,5-dimethyl-2,5-di(t-butylperoxy)hexyne and 1,3-bis(t-butylperoxyisopropyl) benzene, having a decomposition temperature between 170° C. and 200° C. A suitable amount of the peroxide is 0.005 to 5 parts by weight, preferably 0.01 to 1 part by weight per 100 parts by weight of the polyolefin base resin.

There are commercial acid-modified polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical) and "NUC-Ace" (Nippon Unicar).

The unmodified polyolefin resin is polyethylene resin, polypropylene resin, ethylene copolymer resin, polyvinyl chloride resin, or the like.

A suitable content of the acid-modified polyolefin resin in the inner layer is 5 to 80 wt. %, preferably 10 to 60 wt. %. When the content is less than 5 wt. %, it is difficult to form always the pseudo-adhesion by blocking over the whole inner surface. Moreover, the effect upon the improvement in the dispersibility of light-shielding material is reduced. In the case of using polyester resin, polyamide resin or ethylene-vinyl alcohol copolymer resin, layer separation can occur at the boundary between the inner layer and the outer layer. When the content exceeds 80 wt. %, although no problem occurs in the pseudo-adhesion by blocking over the whole surface and on in the improvement in the dispersibility of light-shielding material is obtained, the acid-modified polyolefin adversely affects photographic photosensitive materials. Scrubbability of the mold is also degraded.

As the resin contained in the inner layer other than the acid-modified polyolefin, although there are various resins blendable with the acid-modified resin, such as various thermoplastic resins, various elastomers and tackifier resins, preferred resins are polyolefin resins, such as various ethylene copolymer resins, various propylene copolymer resins, homopolyethylene resin and homopolyethylene resin, which are inexpensive and excellent in film moldability. Particularly preferred resins are L-LDPE resin, EEA resin, EVA resin and LDPE resin. Both of the Shore hardness and Vicat softening point of the resin are preferably lower.

As the resin used for the outer layer, there are various thermoplastic resins, various elastomers, and the like, and it is necessary to select the resin having a higher antiblocking ability, wear resistance, Shore hardness and Vicat softening point than the inner layer. Moreover, in the case of heat sealed uses, such as laminated films for bag, heat sealability is necessary, and in the case of the use for photographic photosensitive materials, it is necessary to select the resin not affecting photographic properties adversely. In the case of requiring heat sealability, suitable resins for the outer layer are various polyolefin resins having a Shore hardness and Vicat softening point higher than the inner layer, and in the case of not requiring heat sealability, suitable resins are various polyamide resins, various polyester resins, high molecular weight polyethylene resins and high molecular weight polypropylene resins.

Preferable resins for the outer layer are those having a Vicat softening point higher than the inner layer by 5° C. or more, preferably 10° C. or more, and being excellent in inflation film moldability, physical strength and heat sealing properties (appearance, prevention of pinholes and rupture, prevention of the decrease in strength, etc.). Such a resin includes ethylene-$\alpha$-olefin copolymer resin having a density of more than 0.920 g/cm$^3$, homopolyethylene resin having a density of more than 0.920 g/cm$^3$, homopolypropylene resin, propylene-$\alpha$-olefin copolymer resin, polyamide resin, such as nylon 6, nylon 66, nylon 11 and nylon 12, including copolymer resin with another resin, polyester resin, ethylene-vinyl alcohol copolymer resin. The resin composing the outer layer is preferably the above resin alone or a blend resin containing more than 50 wt. % of the above resin. Particularly preferable resin resins are homopolyethylene resin and ethylene-$\alpha$-olefin copolymer resin having a density of more than 0.920 g/cm$^3$, polyamide resin, and polyester resin. In view of heat sealing properties, preferable resins are $\alpha$-olefin copolymer resins having 2 to 6 carbon atoms, more preferably ethylene-$\alpha$-olefin copolymer resins, particularly preferably copolymer resins and $\alpha$-olefin having 4 to 10 carbon atoms. A suitable content of these resins is more than 3 wt. %, preferably more than 10 wt. %, more preferably more than 15 wt. %, in view of ensuring heat seal strength with time. By composing the outer layer of an inflation film of a resin composition containing more than 15 wt. % of ethylene-$\alpha$-olefin copolymer resin, heat seal strength with time of packaging bags in ensured, and hot tack properties and physical strength are rendered excellent.

The Shore hardness of the resin used for the outer layer is higher than the inner layer, and higher than 50 D, preferably higher than 60 D, particularly preferably higher than 70 D.

The inflation film may preferably contain carbon black, metal powder (including paste), carbon fiber, conductive polymer, metal fiber, antistatic agent, lubricant, etc., in order to improve antistatic ability.

Carbon blacks, which are the most preferable as the light-shielding material, are divided into gas black, oil furnace black, channel black, anthracene black, acetylene black, Ketjen carbon black, thermal black, lamp black, vegetable black and animal black according to their origin. Among these, oil furnace carbon black is preferably in terms of light-shielding character, cost and improvement of properties. On the other hand, since acetylene black and Ketjen carbon black have an antistatic character, they are also preferable, though they are expensive. They may be blended with the oil furnace black in order to improve its character. Though, there are various blending methods, such as dry coloring, liquid coloring, paste coloring, masterbatch pellets, compound color pellets and gramular color pellets, the masterbatch method using masterbatch pellets is preferred in view of cost and less contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU NO. 43-10362 discloses another method of making a masterbatch by dispersing the carbon black into polyethylene. The inventor also disclosed a resin composition for color masterbatch (EP 0,277,598A).

Particularly preferable carbon black for the packaging material for photographic photosensitive materials is the oil furnace carbon black having a pH of 6 to 9, a mean particle size of 10 to 120 m$\mu$, a volatile components content of less than 2% a content of cyanides and sulfur components of less than 1.0%, preferably less than 0.5%, particularly preferably less than 0.1%, and an oil absorption value of more than 50 ml/100 g in view of no occurrence of fogging, rare occurrence of photosensitivity deviation and great light-shielding ability. Moreover, when it is blended with L-LDPE resin, the lumps of carbon black and fish eyes rarely occur. Channel black is not preferred because of containing components inducing fogging, such as sulfur component, in quantity as well as expensiveness.

Metal powder includes iron powder, stainless steel powder, copper powder, lead powder, aluminum powder, etc. Carbon fiber includes silicon carbide fiber, as well as pure carbon fiber. Carbon fiber improves conductivity and physical properties, but it is expensive. Metal fiber is brass fiber, stainless steel fiber, etc. Metal fiber improves conductivity, but it is expensive as well as causing an increase in specific gravity.

In any event, in the case of using as the packaging material for photosensitive materials, particularly used on the photosensitive material side of the packaging material, it is preferred to select a light-shielding material having a content in total of cyanides and sulfur components of less than 1%, preferably less than 0.5%, more preferably less than 0.1% in order not to degrade photographic properties, such as fogging, sensitivity, tone and color balance. Examples of the light-shielding material usable for the invention are described below.

- Oxides . . . silica, diatomaceous earth, alumina, titanium dioxide, iron oxide, zinc oxide, magnesium oxide, antimony oxide, barium ferrite, strontium ferrite, beryllium oxide, pumice, pumice balloon, alumina fiber, etc.
- Hydroxides . . . aluminum hydroxides, magnesium hydroxides, basic magnesium carbonate, etc.
- Carbonates . . . calcium carbonate, magnesium carbonate, dolomite, etc. Sulfates, sulfites . . . calcium sulfate, barium sulfate, ammonium sulfate, calcium sulfite, etc.
- Silicates . . . talc, clay, mica, asbestos, glass fiber, glass balloon, glass bead, calcium silicate, montmorillonite, bentonite, etc.
- Carbons . . . carbon black, graphite, carbon fiber, carbon hollow bead, etc.
- Others . . . iron powder, copper powder, lead powder, aluminum powder, molybdenum sulfide, boron fiber, silcon carbide fiber, brass fiber, potassium titanate, lead titanate zirconate, zinc borate, barium metaborate, calcium borate, sodium borate, aluminum paste, etc.
- Organic Compounds: wood flour such as pine, oak and sawdust, husk fiber such as almond, peanut and chaff, cotton, jute, paper piece, cellophane piece, nylon fiber, polypropylene fiber, starch, aromatic polyamide fiber, etc.

Among them, preferred absorbents provide opacity, and light-absorptive carbon black, titanium nitride and graphite are particularly preferred because of being excellent in heat resistance and light resistance and being relatively inactive.

Antistatic agent applicable to the invention includes:

Nonionic Antistatic Agent:
- Alkylamine derivatives: Polyoxyethylene alkyl amine, tertiary amine e.g. laurylamine, N,N-bis(2-hydroxyethyl cocoamine, N-hydroxyhexadecyl-di-ethanolamine, N-hydroxyoctadecyl-di-ethanolamine, etc.
- Fatty amide derivatives: Oxalic acid-N,N'-distearylamide butyl ester, polyoxyethylene alkyl amide, etc.
- Ethers: Polyoxyethylene alkyl ether, polyoxyethylene alkyl phenyl ether, etc.
- Polyol esters: Glycerine fatty acid esters, sorbitan fatty acid esters, 1-hydroxyethyl-2-dodecylglyoxazoline, etc.

Anionic Antistatic Agent:
- Sulfonates: Alkyl sulfonate (ROSO$_3$Na), alkylbenzene sulfonate, alkyl sulfate (ROSO$_3$Na), etc.
- Phosphate esters: Alkyl phosphate, etc.

Cationic Antistatic Agent:
- Cationic amides:
- Quaternary ammonium salts: Quaternary ammonium chloride, quaternary ammonium ammonium sulfate, quaternary ammonium nitrate, e.g. stearamide propyl-dimethyl-$\beta$-hydroxyethyl ammonium nitrate, etc.

Ampholytic Antistatic Agent:
- Alkyl betaines:
- Imidaxolines:
- Alkyl imidazolines:
- Metal salts: (RNR'CH$_2$CH$_2$CH$_2$NCH$_2$COO)$_2$ Mg (R$\geq$C, R'$=$H or (CH$_2$)$_m$COO—, etc.
- Alkyl alanines:
- Conductive resin: Polyvinylbenzyl cation, polyacrylic acid cation, etc. Among them, nonionic antistatic agents are particularly preferred, because adverse affect upon photographic properties is small.

As the antistatic agent for the inside, i.e., when the antistatic agent is blended with a thermoplastic resin, whichever of nonionic antistatic agent, anionic antistatic agent or ampholytic antistatic agent. Effective nonionic antistatic agents are ethylene oxide adducts of higher alcohol, ethylene oxide adducts of alkyl phenol, esters, such as esters of higher fatty acid and polyol, polyethylene glycol esters of higher fatty acid, polyethers, amides, such as higher fatty amides, dialkyl amides and ethylene oxide adducts of higher fatty amide. Effective anionic antistatic agents are alkyl allylphosphonic acids, adipic acid, glutamic acid, alkyl sulfonic acid salts, alkyl sulfates, polyoxyethylene alkylphosphates, fatty acid salts, alkyl benzene sulfonates, alkyl naphthalene sulfonates, and sodium dialkyl sulfosuccinates. As to a cationic antistatic agent, amines, such as alkyl amine phosphates, Schiff's base, amide amines, polyethylene imines, complexes of amide amine and metal salt and alkyl esters of amino acid, imidazolines, amine-ethyleneoxide adducts and quaternary ammonium salts are suitable. As to ampholytic antistatic agent, N-acylsarcosinate, amino carboxylic acid esters, alanine metal salts, imidazoline metal salts, carboxylic acid metal salts, dicarboxylic acid metal salts, diamine metal salts, metal salts having ethylene oxide groups, and the like are suitable. As to the other antistatic materials, inorganic electrolytes, metal powders, metal oxides, kaolin, silicates, carbon powder and carbon fiber also exercise the effect of the invention. Besides, graft polymers and polymer blends are also effective.

As to the antistatic agent for the outside, nonionic antistatic agent includes polyols, such as glycerine, sorbitol, polyethylene glycol and polyethylene oxide, polyol esters, higher alcohol-ethylene oxide adducts, alkylphenol-ethylene oxide adducts, fatty acid-ethylene oxide adducts, amides, amide-ethylene oxide adducts and amine-ethylene oxide adducts. Ampholytic antistatic agent includes carboxylic acids, such as alkylalanines, and sulfonic acids. As anionic antistatic agent, carboxylic acid salts, sulfuric acid derivatives, such as alkyl sulfonates, phosphoric acid derivatives, such as phosphonic acid, phosphate esters, and polyester derivatives are suitable. As cationic antistatic agent, amines, such as alkylamines, amido amines and ester amines, vinyl nitrogen derivatives, quaternary ammonium salts, such as ammonium salts containing amide group and ammonium salts containing ethylene oxide, acrylic acid ester derivatives, acrylic amide derivatives, vinyl ether derivatives, and the like are suitable.

Lubricant applicable to the invention includes:

Silicone oil lubricants: silicone oils containing modified siloxane bond, such as dimethylpolysiloxanes and modified thereof (Shin-Etsu Chemical Co., Ltd., Toray Silicone Co., Ltd.), polymethylphenyl siloxanes, olefin-modified silicones, polyether-modified silicones modified with polyethylene glycol or polypropylene glycol, olefin/polyether-modified silicones, epoxy-modified silicones, amino-modified silicones and alcohol-modified silicones. Among the above silicone oils, olefin-modified silicones, polyether-modified silicones, olefin/polyether-modified silicones are excellent.

The silicone oil lubricant makes the basis to obtain a film having good appearance, high sealability and adhesiveness to the article to be packaged without loosening by improving friction coefficient of the film in heated conditions, resulting in reducing sliding resistance generated during hot plate sealing by an automatic packaging machine and in preventing wrinkling. Besides, reduction of gloss sliding is prevented to obtain a good seal portion. By using the silicone oil lubricant, a high temperature friction coefficient can be decreased to less than 1.4 during sliding heat sealing. A suitable viscosity is 50 to 100,000 centistokes at ordinary temperature, and a high viscosity lubricant having a viscosity of 5,000 to 30,000 centistokes at ordinary temperature is preferred. A suitable content varies according to the object of use, and is in the range of 0.01 to 2.5 wt. %, preferably 0.03 to 1 wt. %, more preferably 0.05 to 0.5 wt. %.

The blending effects of the silicone oil lubricant are:
(1) Silicone oil lubricant coats the surface of fiber fillers, non-fiber light-shielding materials and pigments by blending, and improves their dispersibility.
(2) It improves the fluidity of resin resulting in the reduction of screw motor lead and in the prevention of melt fracture.
(3) Fatty amide lubricant, which is liable to bleed out and induces a white powder problem, can be omitted by blending it.
(4) It decreases friction coefficient of a film in heated conditions resulting in the improvement in automatic bag-making ability, in the prevention of wrinkling during heat sealing and of reducing gloss by sliding to obtain a good seal portion.
(5) Light-shielding ability of a light-shielding material is improved by blending together. As a result, the blending amount of the light-shielding material which degrades properties can be reduced.

Saturated fatty amide lubricants
  Behenic amide lubricants: "DIAMID KN" (Nippon Kasei Chemical Co., Ltd.)
  Stearic amide lubricants: "ARMIDE HT" (Lion), "ALFLOW S-10" (Nippon Oil and Fats Co., Ltd.), "FATTY AMIDES" (Kao Corp.), "NEWTRON 2" (Nippon Fine Chemical Co., Ltd.), "DIAMID 200" and "DIAMID AP-1" (Nippon Kasei Chemical Co., Ltd.), "AMIDES S" and "AMIDE T" (Nitto Kagaku K.K.), etc.

Unsaturated fatty amide lubricants
  Erucic amide lubricants: "ALFLOW P-10" (Nippon Oil and Fats Co., Ltd.), "NEWTRON-S" (Nippon Fine Chemical Co., Ltd.), "LUBROL" (I.C.I.), "DIAMID L-200" (Nippon Kasei Chemical Co., Ltd.), etc.
  Oleic amide lubricants: "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), "FATTY AMIDE O" (Kao Corp.), etc.

Bis fatty amide lubricants
  Methylene bis behenic amide lubricants: "DIAMID NK BIS" (Nippon Kasei Chemical Co., Ltd.), etc.
  Methylene bis stearic amide lubricants: "DIAMID 200 BIS" (Nippon Kasei Chemical Co., Ltd.), "ARMOWAX" (Lion Akzo Co., Ltd.), "BISAMIDE" (Nitto Kagaku K.K.), etc.
  Methylene bis oleic amide lubricants: "LUBRON" (Nippon Kasei Chemical Co., Ltd.), etc.
  Ethylene bis stearic amide lubricants: "ARMOSLIP EBS" (Lion Akzo Co., Ltd.), etc.
  Hexamethylene bis stearic amide lubricants: "AMIDE 65" (Kawaken Fine Chemicals Co., Ltd.), etc.
  Hexamethylene bis oleic amide lubricants: "AMIDE 60" (Kawaken Fine Chemicals Co., Ltd.), etc.

Monoalkylol amide lubricants
  N-(2-Hydroxyethyl)lauric amide lubricants: "TOHOL N 130" (Toho Chemical Ind. Co., Ltd.), etc.
  N-(2-Hydroxyethyl)stearic amide lubricants: "AMISOL" (Kawaken Fine Chemicals Co., Ltd.), etc.
  N-(2-Hydroxymethyl)stearic amide lubricants: "METHYLOL AMIDE" (Nitto Kagaku K.K.), etc.

Nonionic surfactant lubricants: "ELECTROSTRIPPER TS-2", "ELECTROSTRIPPER TS-3" (Kao Corp.), etc.

Hydrocarbon lubricants: liquid paraffin, natural paraffin, microwax, synthetic paraffin, polyethylene wax, polypropylene wax, chlorinated hydrocarbon, fluorocarbon, etc.

Fatty acid lubricants: higher fatty acids preferably more than $C_{12}$, hydroxy fatty acids, etc.

Ester lubricants: fatty acid lower alcohol esters, fatty acid polyol esters, fatty acid polyglycol esters, fatty acid fatty alcohol esters, etc.

Alcohol lubricants: polyols, polyglycols, polyglycerols, etc.

Metallic soap: metal salts, such as Li, Mg, Ca, Sr, Ba, Zn, Cd, Al, Sn, Pb salts, of higher fatty acids, such as lauric acid, stearic acid, ricinoleic acid, naphthenic acid, oleic acid, etc.

A suitable content of the lubricant is 0.01 to 5 wt. %, and in the case of fatty amide lubricant having a great lubricating ability and being liable to bleed out, a suitable content is 0.01 to 1 wt. %, and preferably decreases to a minimum content.

The laminated film of the invention may be laminated with a flexible sheet through or without an adhesive layer. A suitable flexible sheet has a Young's modulus (ASTM D-882) of more than 50 kg/mm² and has a heat resistance (which means a flexible sheet having a melting point of more than 100° C. or no melting point, such as paper, cellophane and cloth).

Suitable flexible sheets are various thermoplastic resin films such as various polyethylene resin films, ethylene copolymer resin films, polypropylene resin films, polyvinyl chloride resin films, polyvinylidene chloride resin films, polyamide resin films, polycarbonate resin films, polyester resin films their modified resin films, their uniaxially or biaxially stretched films. Cellulose acetate film, cellophane regenerated cellulose film, ethylene-vinyl alcohol copolymer resin film (Eval resin film), paper, synthetic paper and nonwoven fabric, are also suitable. Preferable flexible sheets are various papers having heat resistance, no melting (no melting point), no adverse affect upon photosensitive materials, and an areal weight of 20 to 400 g/m², such as unbleached kraft paper, semibleached kraft paper, bleached kraft paper, high yield pulp paper, neutral paper, twisting paper, Clupak paper, Duostress paper, white cardboard, photo base paper, pure white roll paper, coated paper, waste paper, regenerated paper, simili and glassine paper.

The above papers may be provided with various printings, various surface treatments, such as coating of a pigment layer, coating a resin layer and metallization, and colorings. Various light-shielding materials may be blended in order to impart light-shielding ability, or may be provided with various embossings.

Other preferable heat-resistant flexible sheets are biaxially stretched thermoplastic resin films and cellophane. Uniaxially stretched thermoplastic resin films are also preferred according to the use of the laminated film.

The biaxially stretched thermoplastic resin film is produced by a known biaxial drawing method such as simultaneously biaxial drawing or successively biaxial stretching, and both of the draw ratios in longitudinal direction (MD) and in lateral direction (CD) are 1.5 to 20 times, preferably 3 to 15 times, respectively. The resin suitable for the film includes polyester resin, polyamide (nylon) resin, polyethylene resin, polystyrene resin, polypropylene resin, polyolefin copolymer resin, polyvinyl chloride resin, polyvinylidene chloride resin, ethylene-vinyl alcohol copolymer resin, ethylene-vinyl acetate copolymer saponified resin, polyacrylonitrile resin, vinylon resin, copolymer resins of the above resins and other resins, including binary, ternary or more copolymers polymerized by random copolymerization or block copolymerization, and blend resins of the above resins and other resins. The resin used for the uniaxially stretched thermoplastic resin film may be selected from the above resins. The above polyester resin includes the resins synthesized from dimethyl terephthalate and ethylene glycol, dimethyl terephthalate and 1,4-cyclohexanedimethanol, dimethyl terephthalate and dimethyl isophthalate, and the like. The polyamide resin includes nylon 6, nylon 66, nylon 11, nylon 6-66 copolymers, etc. The biaxially stretched film is produced by a T die film molding machine or an inflation film molding machine wherein the resin is molded into a film and then drawn biaxially.

The uniaxially or biaxially stretched thermoplastic resin film and cellophane may be provided with metallizing, coating of a polyvinylidene chloride resin layer, various printing or various coloring. They may also provided with various embossings in order to improve slipping character or printability.

A suitable thickness of the biaxially stretched thermoplastic resin film is 5 to 70 μm, preferably 7 to 50 μm, more preferably 10 to 35 μm in order to thin the packaging material, to decrease the cost, and to ensure flexibility and physical strength. When the thickness is less than 5 μm, wrinkling and breakage of the film tend to occur in the laminating process. When the thickness exceeds 70 μm, the film is stiff resulting in the degradation of bag-making ability. Gelbo test strength and handling are also degraded. The Young's modulus of the flexible sheet is preferably higher than 50 kg/mm² more preferably higher than 80 kg/mm², and more than 100 kg/mm² is particularly preferred. The heat resistance of the flexible sheet is preferably higher than the outer layer by 50° C. or more, preferably 100° C. or more, in view of the improvement in bag-making ability and appearance. Examples of suitable flexible sheet are:

|  | Young's Modulus (kg/mm²) | Melting Point (°C.) |
| --- | --- | --- |
| Biaxially Stretched HDPE film | 80–90 | 137 |
| Unstretched polypropylene film | 60–90 | 140 |
| Biaxially stretched polypropylene film | 150–350 | 175 |
| Polyvinylidene chloride-coated Biaxially stretched polypropylene film | 170–260 | 175 |
| Biaxially stretched polyamide film | 130–280 | 225 |
| Biaxially stretched polyester film | 190–400 | 260 |
| Cellophane | 140–210 | 150 (Carbonized) |
| Polyvinylidene chloride-coated cellophane | 160–320 | 150 (Carbonized) |
| Ethylene-vinyl alcohol copolymer film | 190–350 | 180 |
| Biaxially stretched polystyrene film | 280–390 | 160 |
| Polycarborate film | 280–240 | 220 |
| Cellulose acetate film | 50–280 | 260 |
| Kraft paper | 350 | 260 |

The flexible sheet is laminated to the outer layer through or without an adhesive layer. The adhesive layer may be formed by wet laminating, dry laminating, hot melt laminating, the extrusion laminating, coextrusion laminating, etc. Preferred adhesive layers are extrusion laminated adhesive layers containing more than 50 wt. % of at least one of thermoplastic resins of which the content of volatile components which adversely affect photographic photosensitive materials is small, particularly polyolefin resins, such as low density homopolyethylene resin, L-LDPE resin, EEA resin, EAA resin, EVA resin, acid-modified polyolefin resin and propylene copolymer resin. A suitable thickness of the adhesive layer is 1 to 50 μm, preferably 2 to 30 μm, particularly preferably 3 to 10 μm. When the thickness is less than 1 μm, the adhesive force can not be ensured due to the occurrence of membrane rupture. When the thickness exceeds 50 μm, neck-in occurs.

The laminated film of the invention may be laminated with a heat sealing layer. The heat sealing layer has a Vicat softening point (ASTM D-1525) lower than the outer layer by 5° C. or more, preferably 10° C. or more. Suitable resins for the heat sealing layer are various thermoplastic resins having heat-sealability, and various polyolefin resins, particularly low density homopolyethylene resin and various ethylene copolymer resins are preferred. Preferable ethylene copolymer resins are the same as disclosed in the inner layer. Particularly preferred resins are also L-LDPE resin and EEA resin disclosed in reference to the inner layer, and L-LDPE resin is the most preferable. In order to adjust the properties as necessary, it is preferred to blend with other thermoplastic resins, elastomers, rubbers, various additives or modifiers. By incorporating more than 5 wt. %, preferably more than 10 wt. % of ethylene copolymer resin, the decrease with time of heat seal strength can be prevented.

The laminated film of the invention is usable as the packaging material, such as various packaging bags for various photosensitive materials, foods, medicines, dyes, resins, agricultural products, fish meals, fertilizers, cements, and explosives, covering films for commercial goods, multifilms for agricultural chemicals, waterproof films, moistureproof films, light-shielding films, low temperature-resistant films, heat-resistant films, etc.

The laminated film of the invention is suitable for packaging the following photosensitive materials.

Silver halide photographic photosensitive materials: photographs for roentgenogram, films for printing (lithfilm), monochromatic and color photographic printing papers, color films, master papers for printing, DTR photosensitive materials, films and papers for computerized type-setting system, microfilms, films for movies, self-developing type photographic photosensitive materials, direct positive films and papers, etc.

Diazonium photographic photosensitive materials: 4-morpholinobenzene diazonium microfilms, microfilms, copying films, form plates for printing, etc.

Azide, diazide photographic photosensitive materials: photosensitive materials containing parazidobenzoate, 4,4'-diazidostilbene, etc., such as copying films and form plates for printing etc.

Quinone diazide photographic photosensitive materials: photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging material of the invention is also applicable to various photosensitive materials degraded or denatured by light, oxygen, sulfur dioxide gas or the like, such as foods including peanut butter, margarine, snacks, relishe, cakes, teas and lavers, medicines including powder and granular medicines placed in a bag for stomach and bowels and for cold, ABS resin, dyes, pigments, photographic developing agent, photographic fixing agent, toners and the like.

Package form includes a single-sheet flat bag, a double-sheet flat bag, a self-standing bag, a single-sheet gusset bag, a double-sheet gusset bag, standing pouch, satchel bag, laminated film, inner lining for a moistureproof box, inner lining for a light room-loading light-shielding box, light-shielding member for magazineless light room-loading, and a leader paper etc. The bag-making may be conducted according known adhesion of plastic films, such as hot plate welding, impulse welding, ultrasonic welding and high frequency welding etc. The methods of using an adhesive and the methods of using a pressure-sensitive adhesive or a heat-sensitive adhesive may also be used.

Taking into consideration of the case of earth filling, to blend a degradable plastic is preferred, such as biodegradable polymers ("BIOPOL", ICI, polycaprolactone, UCC., etc.). To blend natural or synthetic polyer which is biodegradable, such as starch, various ethylene copolymer resins, and various polyethylene resins are also applicable. Photodegradable polymers are also applicable, such as ECO copolymer which is a polyethylene of which the main chain contains carbonyl groups as the photosensitive group produced by copolymerization of ethylene and CO gas, various photodegradable polymers of which the photodegradation ability is imparted by blending a transition metal salt, an oxidation accelerator, a photosensitizer, etc.

Some embodiments of the laminated film of the invention are shown in FIGS. 1 through 27.

The laminated film 8a of FIG. 1 is formed of a single layer inflation film composed of a light-shielding inner layer 1a which is deflated and joined by blocking B. The laminated film 8 is cut into two webs, and the joined inner layer portion at the cut end forms a heat fused portion 2 to ensure joining. The inner layer may not contain a light-shielding material.

The laminated film 8a of FIG. 2 is formed of a coextruded double layer inflation film 9a composed of a light-shielding inner layer 1a and a light-shielding outer layer 3a which is deflated and joined by blocking B. The laminated film 8 is cut into two webs, and the joined inner layer portion at the cut end forms a heat fused portion 2 to ensure joining. The inner layer and outer layer may not contain a light-shielding material.

The laminated film 8a of FIG. 3 is formed of a coextruded triple layer inflation film 10a composed of a light-shielding inner layer 1a, a light-shielding outer layer 3a and a middle layer 4 which is deflated and joined by blocking B. The laminated film 8 is cut into two webs, and the joined inner layer portion at the cut end forms a heat fused portion 2 to ensure joining. Every layer may or may not contain a light-shielding material.

The laminated film of FIG. 4 is the same as that of FIG. 1 of which the other end is also cut off, and forms a heat fused portion 2.

The laminated film of FIG. 5 is the same as that of FIG. 2 of which the other end is also cut off, and forms a heat fused portion 2.

The laminated film of FIG. 6 is the same as that of FIG. 3 of which the other end is also cut off, and forms a heat fused portion 2.

The laminated film of FIG. 7 is composed of the laminated film of FIG. 2 and a flexible sheet 6 laminated thereonto through an adhesive layer 5.

The laminated film of FIG. 8 is composed of the laminated film of FIG. 3 and a heat sealing layer 7 directly laminated thereonto by extrusion laminating.

In the laminated films 11a of FIGS. 9 through 15, the inner layer contains a thermoplastic resin having a Shore hardness lower than the resin of the outer layer and/or the inner layer contains an acid-modified polyolefin resin.

The laminated film of FIG. 9 is formed of a coextruded double layer inflation film 9a composed of a light-shielding inner layer 1a and an outer layer 3 which is deflated and joined by blocking B.

Figure 10:
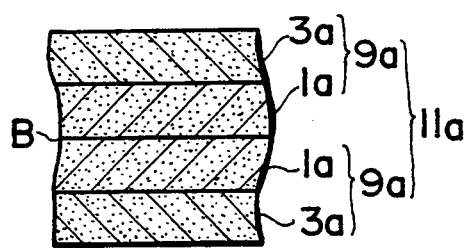

The laminated film of FIG. 10 is the same as that of FIG. 9, except that the outer layer 3a also contains a light-shielding material.

Figure 11:
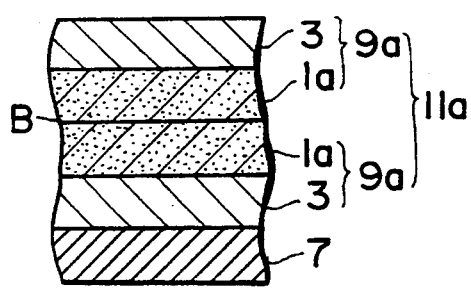

The laminated film of FIG. 11 is composed of the laminated film of FIG. 9 and a heat sealing layer 7 directly laminated thereto.

Figure 12:
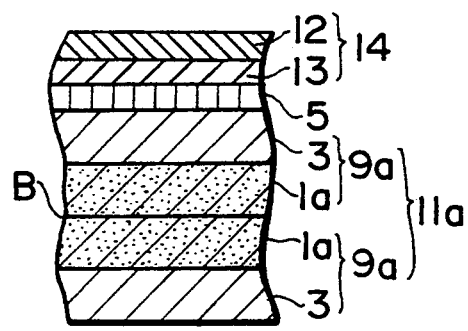

The laminated film of FIG. 12 is composed of the laminated film of FIG. 9 and a metallized flexible sheet layer 14 of a heat-resistant flexible sheet 12 (13 is a metal membrane layer) laminated through an adhesive layer 5.

Figure 13:
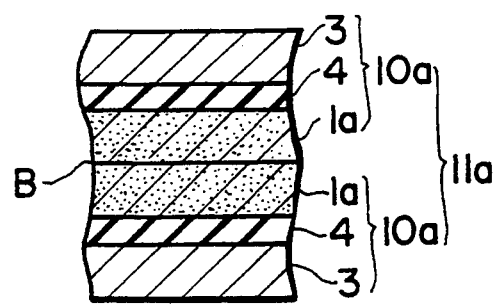

The laminated film of FIG. 13 is formed of a coextruded triple layer inflation film 10a composed of a light-shielding inner layer 1a, a middle layer 4 and an outer layer 3 which is deflated and joined by blocking B.

Figure 14:
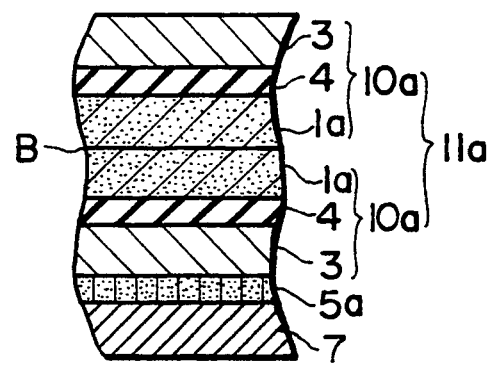

The laminated film of FIG. 14 is composed of the laminated film of FIG. 13 and a heat sealing layer 7 laminated thereonto through an adhesive layer 5a containing a light-shielding material.

Figure 15:
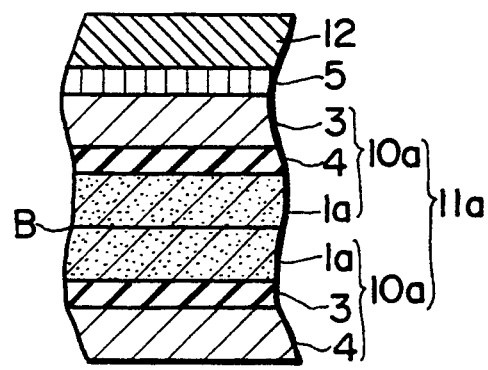

The laminated film of FIG. 15 is composed of the laminated film of FIG. 13 and a heat-resistant flexible sheet layer 12 laminated thereonto through an adhesive layer 5.

Figure 16:
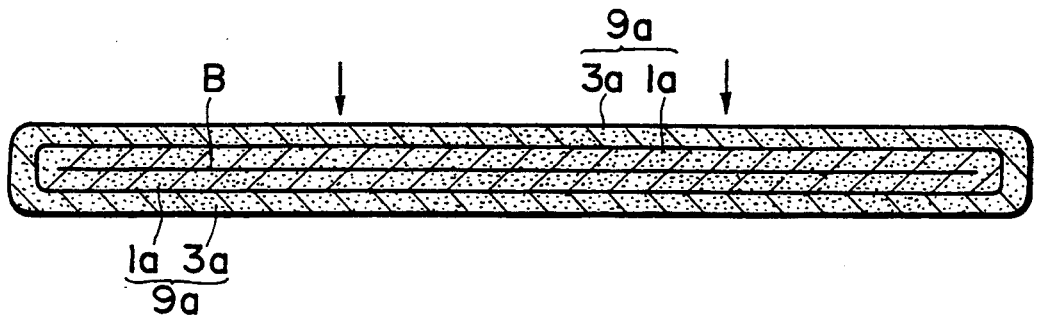
FIG. 16 is a sectional view illustrating a coextruded double layer film which is deflated and of which the inner layer is joined by blocking.

FIG. 16 illustrates a whole section of a laminated film formed of a coextruded double layer inflation film 9a composed of a light-shielding inner layer 1a and a light-shielding outer layer 3a which is deflated and joined by blocking B. The positions indicated by an arrow are slitted by a heated razor to obtain the laminated film of FIGS. 2 and 5.

FIGS. 17 through 21 illustrate various patterns of the strongly joined portions.

Figure 17:
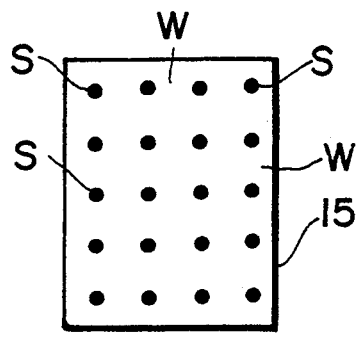
FIGS. 17 through 21 are partial plan views illustrating various patterns of the strongly joined portions and the weakly joined portions.

In the laminated film 15 of FIG. 17, the strongly joined portions S are formed into spots in the weakly joined portion W.

Figure 18:
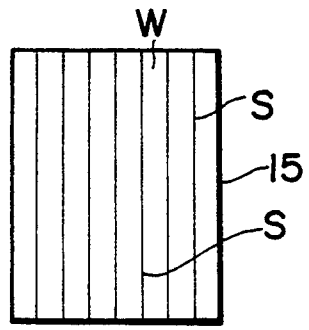

In the laminated film 15 of FIG. 18, the strongly joined portions S are formed into streaks in the longitudinal direction in the weakly joined portion W.

Figure 19:
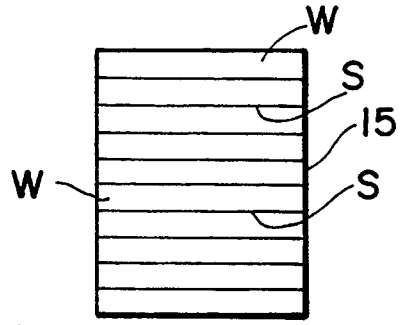

In the laminated film 15 of FIG. 19, the strongly joined portions S are formed into streaks in the lateral direction in the weakly joined portion W.

Figure 20:
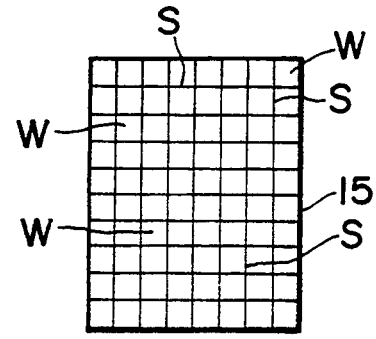

In the laminated film of FIG. 20, the strongly joined portions S are formed into lattice in the weakly joined portion W.

Figure 21:
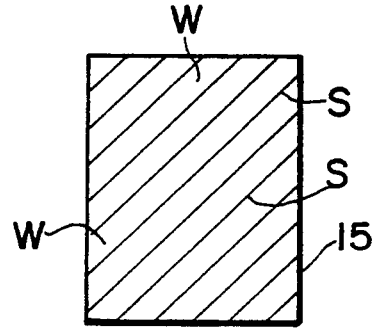

In the laminated film of FIG. 21, the strongly joined portions S are formed into streaks in an oblique direction.

FIGS. 22 through 28 illustrate various laminated films 16a wherein the end portions are joined more strongly than the central portion.

Figure 22:
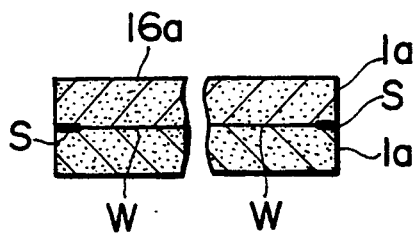
FIGS. 22 through 28 are partial sectional views of a laminated film of the invention, wherein the end portions are joined strongly more than the central portion.

The laminated film 16a of FIG. 22 is produced by superposing two single layer sheets composed of a light-shielding inner layer 1a, blocking the faced portion to form the weakly joined portion W, and pressing both end portions to form the strongly joined portions S by blocking.

Figure 23:
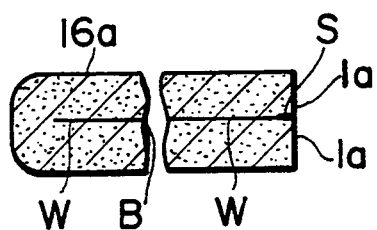

The laminated film of FIG. 23 is produced by turning up a single layer sheet composed of a light-shielding inner layer 1a, blocking the faced portion to form the weakly joined portion W, and pressing the end portion opposite to the folded end to form the strongly joined portion S by blocking.

Figure 24:
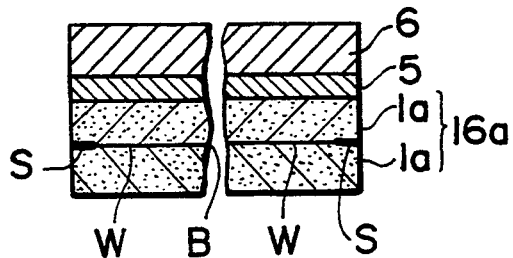

The laminated film of FIG. 24 is composed of the laminated film of FIG. 22 and a flexible sheet is laminated thereonto through an adhesive layer 5.

Figure 25:
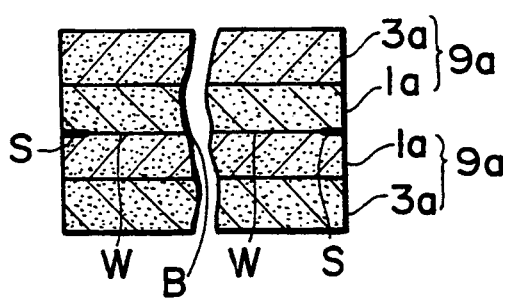

The laminated film of FIG. 25 is the same as that of FIG. 22 except that both superposed sheets are not a single layer sheet but a coextruded double layer film 9a composed a light-shielding inner layer 1a and a light-shielding outer layer 3a.

Figure 26:
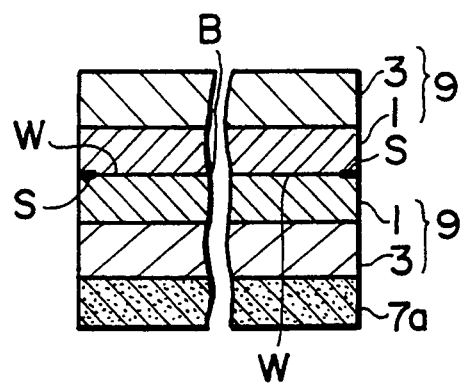

The laminated film of FIG. 26 is composed of the laminated film of FIG. 25, wherein both of the inner layer 1 and the outer layer 3 do not contain a light-shielding material, and a heat sealing layer 7a containing a light-shielding material is directly laminated thereonto.

Figure 27:
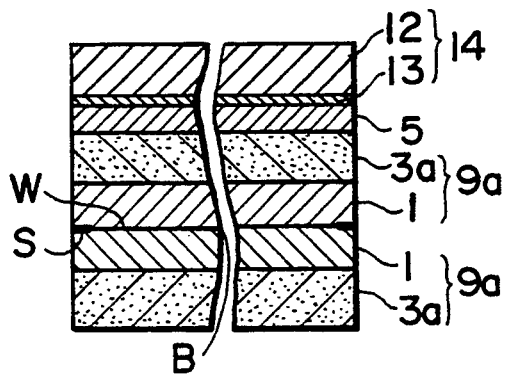

The laminated film of FIG. 27 is composed of the laminated film of FIG. 25, wherein the inner layer 1 does not contain a light-shielding material, and a metallized flexible sheet layer 14 is laminated thereonto through an adhesive layer 5.

Figure 28:
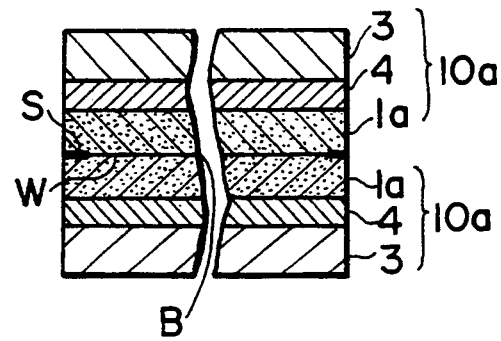

The laminated film of FIG. 28 is the same as that of FIG. 22 except that both superposed sheets are not a single layer sheet but a coextruded triple layer film 10a composed of a light-shielding inner layer 1a, a middle layer 4 and an outer layer 3.

Figure 29:
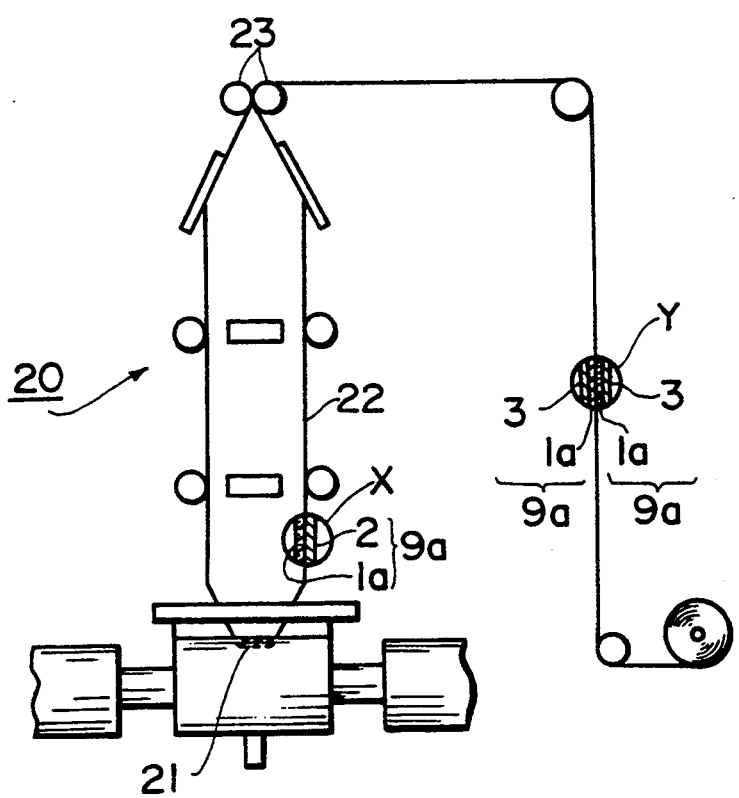
FIG. 29 is a schematic illustration of an inflation film molding apparatus showing the state of producing a laminated film laminated by blocking.
Figure 29:
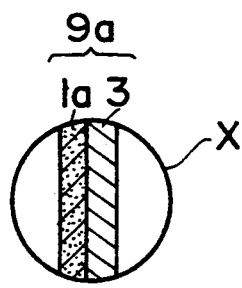
Figure 29:
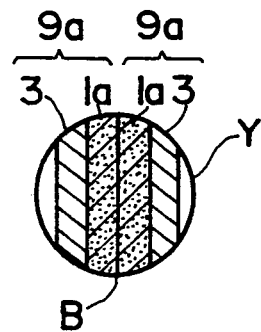

The laminated film formed of an inflation film of which the inner surface is joined by blocking can be produced, for example, by the inflation film molding apparatus 20 shown FIG. 29. In the apparatus, molten resins are co-extruded from a ring die 21, and inflated by air. The inflated tubular film 22 travels upward, and is deflated by passing a nip roll 23. At that time, the inner layer 1a of the coextruded double layer inflation film 9a is joined by blocking B as shown in circle Y.

Figure 30:
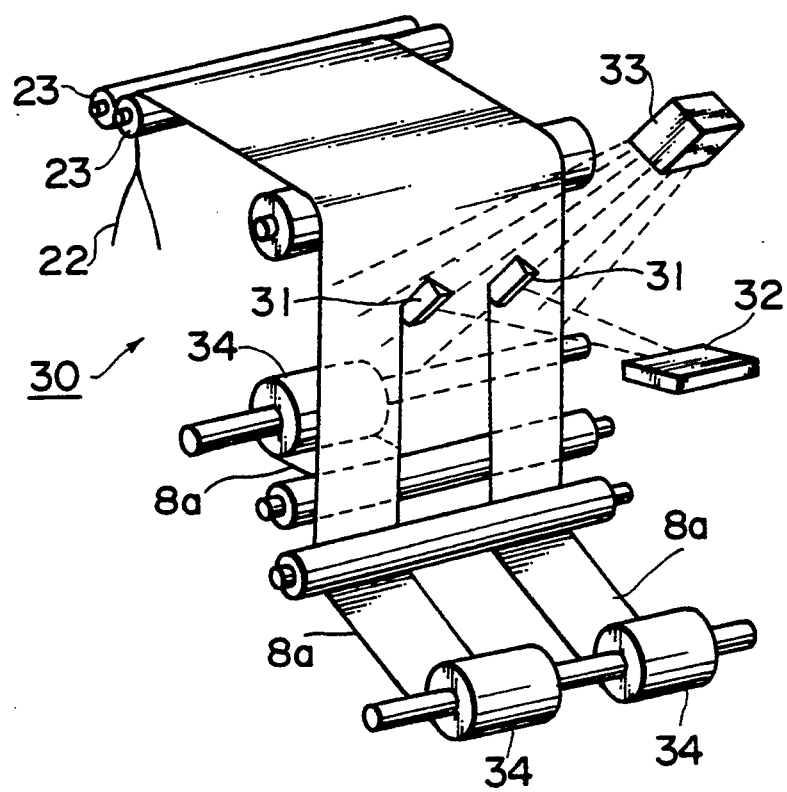
FIG. 30 is a perspective view illustrating the manufacturing state of the laminated film of the invention wherein the cut end is joined by heat fusion.
Figure 31:
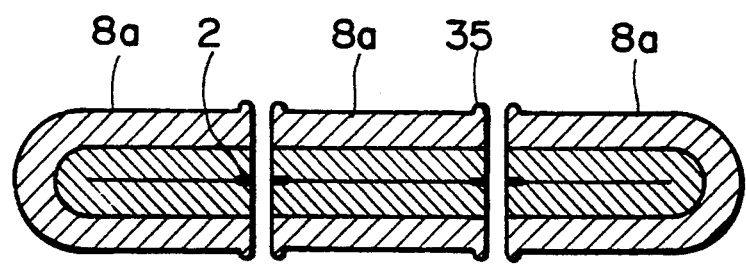
FIG. 31 is a schematical sectional view of the laminated film of the invention produced by the apparatus of FIG. 30.

The laminated film wherein the cut end is joined by heat fusion can be produced, for example, by the cutting apparatus 30 shown in FIG. 30. This apparatus 30 is provided on the down stream side of the inflation film molding apparatus 20. The inflation tubular film 22 is deflated and the inner layer is joined by blocking during passing the nip roll 23. The laminated film joined by blocking travels horizontally, and then turned to downward. Two heated razor blades 31,31 are provided so as to slit the traveling laminated film into an equal width. The heated razor blades 31 are heated by an electric heater so that the blades are adjusted to a prescribed temperature in the range of 50° C. to the melting point of the film 8a, preferably around the softening point of the film. Higher than the softening point of the inner layer is particularly preferred. 33 is an ion sputter emitter for eliminating static electricity generated at the contact portion of each blade with the film caused by the friction. The laminated film is slitted into three webs 8a by the blades 31, and then taken up into rolls 34. A section of the slitted film is shown in FIG. 31. As shown in the figure, the outer end of the blocking portion forms a heat fused portion 2, and the outer edge 35 is slightly thickened.

Figure 32:
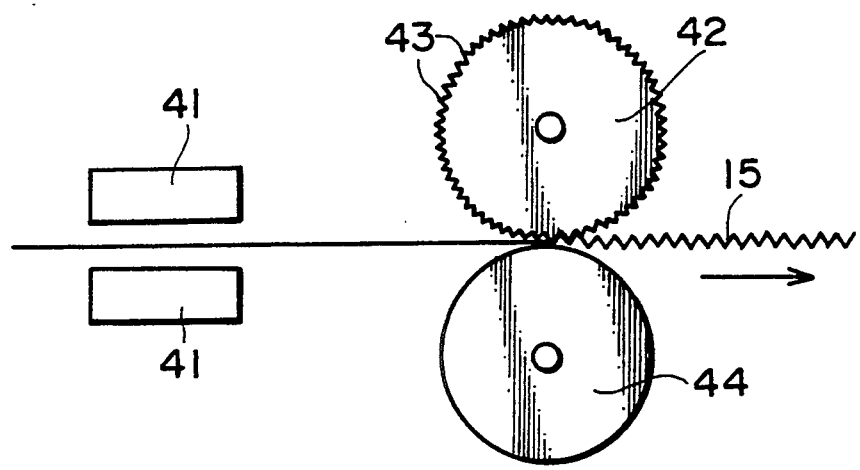
FIG. 32 is a schematic side view of an apparatus for producing the laminated film of the invention having a pattern of the strongly joined portions.

The laminated film 15 having a pattern of the strongly joined portions shown in FIG. 19 can be produced by using the apparatus shown in FIG. 32 heating the laminated film joined by blocking by a heater 41 and then passing a pair pressure rolls composed of an embossing roll 42 of which the surface is formed with ribs 43 in the axial direction at regular intervals and a flat roll 44.

Figure 33:
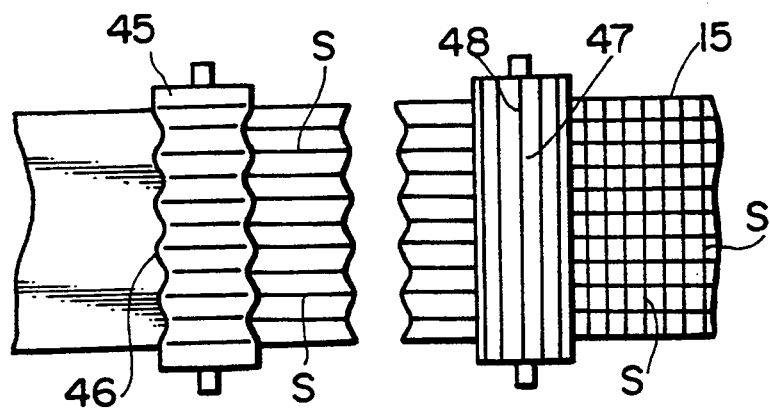
FIG. 33 is a schematic plan view of another apparatus for producing the laminated film of the invention having a pattern of the strongly joined portions.

The laminated film 15 having a pattern of the strongly joined portions shown in FIG. 20 can be produced by using the apparatus shown in FIG. 33, heating, passing to first embossing roll 45 having ribs 46 in the circumferential direction to form the strongly joined streaks S in the longitudinal direction, and then passing the second embossing roll 47 having ribs 48 in the axial direction to form the strongly joined streaks S in the lateral direction.

Figure 34:
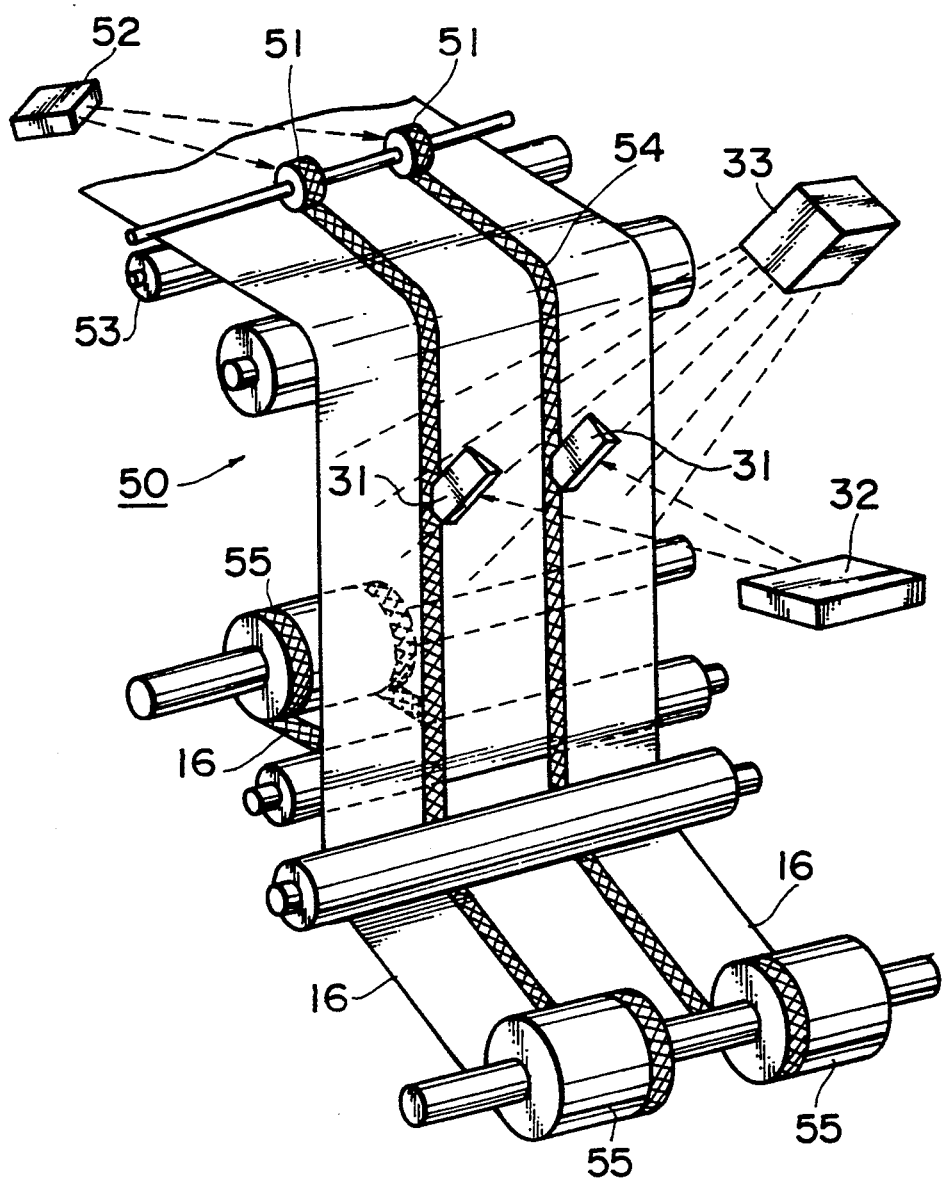
FIG. 34 is a perspective view illustrating the preparation of a laminated film of the invention of which the end portions are joined more strongly than the central portion.

The laminated film 16 wherein the end portions are joined more strongly than the central portion can be produced by the apparatus 50 shown in FIG. 34. This apparatus is the same as the cutting apparatus 30 of FIG. 30 wherein two embossing rolls 51,51 having an oblique lattice projection pattern on the surface are provided so as to partition the laminated film by blocking into three parts in the longitudinal direction. The embossing rolls 51 are heated by a heater 52 to higher than the Vicat softening point of the inner layer of the laminated film. A support roll 53 which is a heat-resistant elastic roll is provided under the embossing rolls 51 so as to nip the traveling laminated film by the support roll 53 and the embossing rolls 51. Two strongly joined lines 54 are formed by passing the laminated film through the heated embossing rolls 51. Then, the laminated film is slit into three webs 16a having a section of FIGS. 22 or 23, and then taken up into rolls 55.

Figure 35:
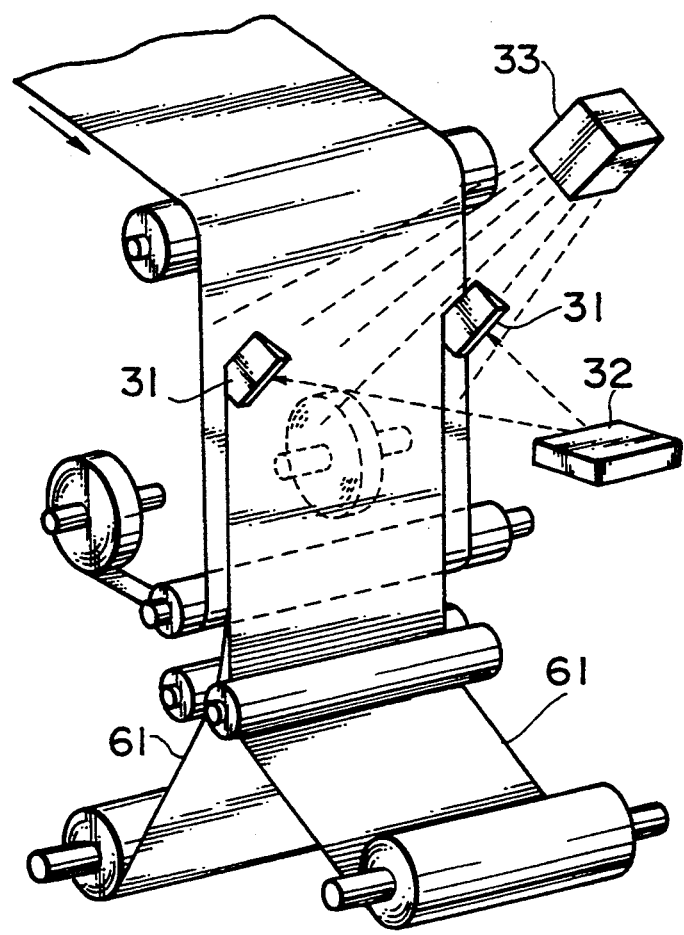
FIG. 35 is a perspective view of a slitting apparatus applicable to the invention.
Figure 36:
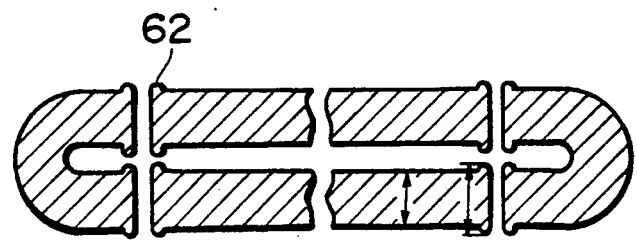
FIG. 36 is a partial sectional view of an inflation film slit by this apparatus.

The cutting apparatus of FIG. 30 can be used for edge trimming by changing the position of the heated razor blades 31, as shown in FIG. 35. The deflated inflation film is not laminated by blocking as usual, and edge-trimmed films 61 are wound separately. The cut end 62 is slightly thickened as shown in FIG. 36.

Figure 37:
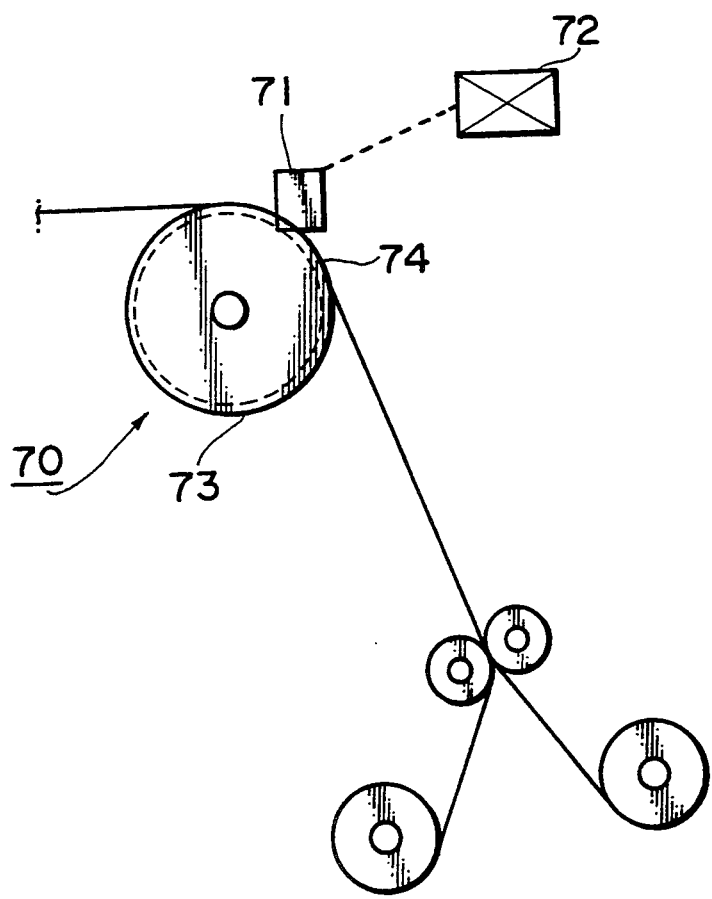
FIG. 37 a schematic side view of a slitting apparatus also applicable to the invention.

Another cutting apparatus 30 capable of forming a heat fused portion at cut ends is shown in FIG. 37. In this apparatus, the cutting portion is composed of fixed heated razor blades 71 heated by a heater 72 and a fixed roll 73 with channels 74.

In the above cutting apparatuses, the means to eliminate static electricity is not limited to the ion sputter but includes using a corona discharge apparatus, contacting the surface of the laminated film with metal lace, conductive film or conductive knitted, woven or nonwoven fabric composed of a conductive fiber, such as metal fiber or carbon fiber.

EXAMPLES

Example 1

A laminated film of which the inner surface is joined by blocking and the cut end is joined by heat fusion was prepared from a coextruded double layer inflation film.

The outer layer was composed of ethylene-hexene-1 copolymer resin having a MI (ASTM D-1238, at 190° C.) of 2.1 g/10 minutes, a density (ASTM D-1505, at 23° C.) of 0.920 g/cm$^3$, a Vicat softening point (ASTM D-1525) of 102° C. and a Shore hardness (ASTM D-2240) of 55 D, containing 15 wt. % of homopolyethylene resin having a MI of 1.2 g/10 minutes, a density of 0.950, a Vicat softening point of 123° C. and a Shore hardness of 69 D, 2 wt. % of oil furnace carbon black having a mean particle size of 21 mμ, 0.2 wt. % of monoglycerine ester, 0.05 wt. % of dimethylpolysiloxane having a viscosity of 10,000 centistokes and 0.1 wt. % of 5,8-dimethyl-tocotrienol, and had a thickness of 20 μm.

The inner layer was composed of ethylene-butene-1 copolymer resin having a MI of 1.0 g/10 minutes, a density of 0.89 g/cm$^3$, a Shore hardness of 38 D and a Vicat softening point of 75° C., containing 5 wt. % of cumarone-indene resin, 3 wt. % of oil furnace carbon black having a mean particle size of 21 mμ, 0.05 wt. % of dimethylpolysiloxane having a viscosity of 10,000 centistokes and 0.05 wt. % of 5,8-dimethyl-tocotrienol, and had a thickness of 30 μm.

The above inflation film was molded by coextruding from the ring die of an inflation film molding machine at a blow-up ratio of 1.4 into a cylindrical tubular film, and the outer layer was heated by a far-infrared lamp at the position immediately under the guide plate so that the surface temperature became 40° to 70° C. The inner layer of the tubular film was joined by blocking during passing through a squeeze roll (nip roll), as shown in FIG. 16, and then slit into three webs each having a width of 50 cm by heated razor blade which was heated to 80° C. by its electric resistance to obtain the object laminated films shown in FIGS. 1 and 4.

The laminated film was not separated from the cut end during the bag making process, and had a suitable adhesive strength of 20 g/15 mm width, a tear strength of more than 1,600 g in both of the longitudinal and lateral directions, and a Gelbo test strength of more than 300 times. Curling was very small. The laminated film was suitable for light-shielding bags for containing articles, and put to practical use as a light-shielding bag for a roll of movie film having sharp edges (35 mm×3,000 ft). Compared with the conventional laminated film produced by laminating two light-shielding LDPE film 70 μm in thickness onto both sides of a cross-laminated porous fabric through a longitudinal streak adhesive layer, the cost of the laminated film was reduced to less than half. Since the laminated film had a suitable rigidity, no curling and contained dimethylpolysiloxane in the outer layer, the friction coefficient of the film in the heated conditions was small. The laminated film was excellent in bag-making ability by an automatic bag-making machine, heat sealing properties, such as sealability with other materials, hot tack properties, heat seal strength and heat seal strength with time, and insertion of the article to be packaged.

Moreover, it was found that the light-shielding ability and antioxidation ability were sharply improved by combining dimethylpolysiloxane, carbon black and 5,8-dimethyl-tocotrienol by their synergistic effect. Dimethylpolysiloxane (Viscosity: 10,000 centistokes) used as lubricant improved the dispersibility of carbon black without affecting photographic properties adversely improved, the slipping character, decreased the friction coefficient of the laminated film under the heated conditions without the generation of white powder due to the bleeding out of lubricant such as in the case of fatty amide, and prevented the occurrence of wrinkling and the reduction of gloss.

Example 2

A laminated film of which the inner surface is joined by blocking and the cut end is joined by heat fusion was prepared from a single layer inflation film 50 μm in thickness.

The resin composition was composed of 87.65 wt. % of ethylene-4-methylpentene-1 copolymer resin having a MI of 2.1 g/10 minutes, a density of 0.920 g/cm$^3$, a Vicat softening point of 100° C. and a Shore hardness of 56 D, 10 wt. % of homopolyethylene resin having a MI of 1.1 g/10 minutes, a density of 0.954, a Vicat softening point of 126° C. and a Shore hardness of 69 D, 2 wt. % of oil furnace carbon black having a mean particle size of 21 mμ, 0.2 wt. % of nonionic antioxidant ("Electrostripper TS-2", Kao Corp.), 0.05 wt. % of dimethylpolysiloxane having a viscosity of 10,000 centistokes and 0.1 wt. % of 5,8-dimethyl-tocotrienol.

The above inflation film was molded by using an inflation film molding machine at a blow-up ratio of 1.2 into a cylindrical tubular film. After passing the guide plate, the tubular film was pressed by passing a pressure mat roll with 50 mesh (squeeze roll for taking up) heated to 100° C. to obtain a laminated film 97 μm in thickness wherein the inner layer was partially strongly joined.

The laminated film was not separated from the cut end during the bag making process. The tear strength was more than 1,600 g, and the Gelbo test strength was more than 300 times. The laminated film was excellent in heat sealing properties, bag-making ability, insertion of the article to be packaged, similar to Example 1.

Comparative Example 1

A laminated film was prepared using the resin composition of Example 2 wherein 0.05 wt. % of dimethylpolysiloxane having a viscosity of 10,000 centistokes and 0.1 wt. % of 5,8-dimethyl-tocotrienol were not added by the same method as Example 2, except that the tubular film was passed a common squeeze roll for taking out having a flat surface instead of the heated pressure mat roll, and slit by a razor at ordinary temperature. In the inflation film, the inner layer was not joined. The light-shielding ability of the inflation film was insufficient, and fogging by light scarcely occurred.

Example 3

The layer contruction corresponds to FIG. 9.

The inner layer was composed of 75.8 wt. % of ethylene-octene-1 copolymer resin having a MI of 2.5 g/10 minutes, a density of 0.92 g/cm$^3$, a Vicat softening point of 98° C. and a Shore hardness of 58 D, 20 wt. % ethylene-vinyl acetate type acid-modified polyolefin resin having a MI of 2.4 g/10 minutes, a density of 0.94, a Vicat softening point of 59° C. and a Shore hardness of 35 D, 3 wt. % of oil furnace carbon black of pH 7.7 having a mean particle size of 21 mμ, 1.0 wt. % of calcium stearate, 0.1 wt. % of a phenol antioxidant and 0.1 wt. % of a phosphorus-containing antioxidant, and had a thickness of 25 μm, a Shore hardness of 52 D and a Vicat softening point of 92° C.

The outer layer was composed of 71.7 wt. % of ethylene-4-methylpentene-1 copolymer resin having a MI of 2.1 g/10 minutes, a density of 0.92 g/cm$^3$, a Shore hardness of 57 D and a Vicar softening point of 100° C., 10 wt. % of homopolyethylene resin 15 wt. % of ethylene-4-methylpentene-1 copolymer resin having a MI of 2.1 g/10 minutes, a density of 0.94 g/cm$^3$, a Shore hardness of 63 D and a Vicat softening point of 118° C., 3 wt. % of oil furnace carbon black of pH 7.7 having a mean particle size of 21 mμ, 0.3 wt. % of antistatic agent ("Electrostripper TS-2", Kao Corp.), and had a thickness of 25 μm, a Shore hardness of 62 D and a Vicat softening point of 116° C.

The above inflation film 50 μm in total thickness was molded by an inflation film molding machine into a cylindrical tubular film, and the surface of the outer layer was air-cooled. Then, it was heated again to 60° C. by a ring form far-infrared lamp at the position on the down stream side by 1.5 m from the frost line. The inflation film was passed the usual nip roll of the inflation film molding machine, and the inner layer of the inflation film was joined by blocking to obtain a symmetrical laminated film 100 μm in thickness composed of four layers.

Example 4

The layer construction corresponds to FIG. 10.

The resin composition of the inner layer was the same as the inner layer of Example 3, and the thickness was 40 μm.

The outer layer was composed of 20 wt. % of L-LDPE type acid-modified polyolefin resin having a MI of 1.3 g/10 minutes, a density of 0.94 g/cm$^3$, a Shore hardness of 56 D, a Vicat softening point of 100° C. and a melting point of 120° C., and 80 wt. % of nylon 66 resin ("Leona", Asahi Chemical Ind.), and had a thickness of 10 μm, a Rockwell hardness (ASTM D-785) of 119 R and a Vicat softening point of 198° C.

The surface of the outer layer of the above coextruded double layer inflation film 50 μm in thickness was air-cooled, and the inner layer was contacted with a water-cooled mandrel (cooling water temperature: 10° C.). After the bubble became stable, the inner layer of the inflation film was joined by blocking by passing it through a nip roll of the inflation film molding machine to obtain a symmetrical laminated film composed of four layers.

Example 5

The layer construction corresponds to FIG. 9.

This laminated film was the same as the laminated film of Example 3, except that the ethylene-vinyl acetate type acid-modified polyolefin resin was replaced by L-LDPE type acid-modified polyolefin resin having a MI of 6.2 g/10 minutes, a density of 0.91 g/cm$^3$, a Shore hardness of 46 D, a Vicat softening point of 91° C. and a melting point of 112° C. As a result, the Shore hardness of the inner layer was changed to 55 D, and the Vicat softening point was changed to 96° C.

Example 6

The layer construction corresponds to FIG. 9.

This laminated film was the same as the laminated film of Example 3, except that the ethylene-vinyl acetate type acid-modified polyolefin resin was replaced by LDPE type acid-modified polyolefin resin having a MI of 1.1 g/10 minutes, a density of 0.90 g/cm$^3$, a Shore hardness of 50 D, a Vicat softening point of 92° C. and a melting point of 110° C. As a result, the Shore hardness of the inner layer was changed to 56 D, and the Vicat softening point was changed to 97° C.

Example 7

The layer construction corresponds to FIG. 12.

This laminated film had a six layer construction composed of the same laminated film joined by blocking of Example 3, and an aluminum-metallized biaxially stretched polyester resin film 10 μm in thickness having a Young's modulus of 218 kg/mm$^2$, a melting point of 260° C. and an aluminum membrane 400 Å thick laminated thereonto through a polyolefin adhesive layer 15 μm in thickness composed of 15 wt. % of L-LDPE type acid-modified polyolefin resin having a MI of 9 g/10 minutes, a density of 0.93 g/cm$^3$, a Shore hardness of 53 D, a Vicat softening point of 95° C. and a melting point of 120° C. and 85 wt. % of high pressure branched homopolyethylene resin having a MI of 7 g/10 minutes, a density of 0.92 g/10 minutes, a Shore hardness of 51 D and a Vicat softening point of 92° C. provided by extrusion laminating at the resin temperature of 300° C., so that the aluminum membrane layer faced the outer layer.

Example 8

The layer construction is similar to FIG. 12.

This laminated film was the same as that of Example 7, except that the aluminum-metallized biaxially stretched polyester resin film was replaced by a biaxially stretched film having a Young's modulus of 210 kg/mm$^2$ and a melting point of 120° C. called KOP film which was composed of a biaxially stretched polypropylene resin film 20 µm in thickness of which both faces were coated with a polyvinylidene chloride resin layer 1.5 µm in thickness.

Example 9

The layer construction corresponds to FIG. 12.

This laminated film was the same as that of Example 7, except that the aluminum-metallized biaxially stretched polyester resin film was replaced by an aluminum-metallized biaxially stretched nylon film 15 µm in thickness having a Young's modulus of 246 kg/mm$^2$ and a melting point of 220° C.

Example 10

The layer construction corresponds to FIG. 11.

This laminated film had a five layer construction composed of the same laminated film joined by blocking of Example 4, and a light-shielding heat sealing layer 30 µm in thickness composed of 10 wt. % of L-LDPE type acid-modified polyolefin resin having a MI of 3.5 g/10 minutes, a density of 0.93 g/cm$^3$, a Shore hardness of 53 D, a Vicat softening point of 98° C. and a melting point of 120° C., 57 wt. % of high pressure branched homopolyethylene type acid-modified polyolefin resin having a MI of 7 g/10 minutes, a density of 0.92 g/10 minutes, a Shore hardness of 51 D and a Vicat softening point of 92° C., 30 wt. % of ethylene-butene-1 copolymer resin having a MI of 15 g/10 minutes, a density of 0.92 g/cm$^3$, a Shore hardness of 56 D and a Vicat softening point of 105° C. and 3 wt. % of oil furnace carbon black of pH 7.7 having a mean particle size of 21 mµ provided by extrusion laminating at the resin temperature of 320° C.

Comparative Example 2

The layer construction is similar to FIG. 9.

This laminated film was the same as the reversed laminated film of Example 3, i.e. the inner layer of Example 3 was used as the outer layer and the outer layer of Example 3 was used as the inner layer.

Comparative Example 3

The layer construction is similar to FIG. 9.

This laminated film was 100 µm in thickness, and composed of the outer layer which was the same as the outer layer of Example 3, and the inner layer 25 µm in thickness which was composed of 96.9 wt. % of a commercial ethylene-octene-1 copolymer resin ("Stamilex", DSM) having a MI of 2.0 g/10 minutes, a density of 0.92 g/cm$^3$, a Shore hardness of 57 D and a Vicat softening point of 108° C., 0.1 wt. % of oleic amide and 3 wt. % of oil furnace carbon black of pH 7.7 having a mean particle size of 21 mµ. The inner layers were joined by blocking.

Properties of the laminated films of Examples 3 to 10 and Comparative Examples 2 and 3 are summarized in Table 1.

TABLE 1

| | Unit | Example 3 | Example 4 | Example 5 | Example 6 | Example 7 | Example 8 |
|---|---|---|---|---|---|---|---|
| Layer Construction | — | FIG. 9 | FIG. 10 | FIG. 9 | FIG. 9 | FIG. 12 | Similer to FIG. 12 |
| Inner Layer | | | | | | | |
| Thickness | µm | 25 | 40 | 25 | 25 | 25 | 25 |
| Shore Hardness | D | 52 | 52 | 55 | 56 | 52 | 52 |
| Vicat Softening point | °C. | 92 | 92 | 96 | 97 | 92 | 92 |
| Outer Layer | | | | | | | |
| Thickness | µm | 25 | 10 | 25 | 25 | 25 | 25 |
| Shore or Rockwell | D | 63 | — | 63 | 63 | 63 | 63 |
| Hardness | R | — | 115 | — | — | — | — |
| Vicat Softening point | °C. | 116 | 198 | 116 | 116 | 116 | 116 |
| Inflation Film | | | | | | | |
| Number of Layers | — | 2 | 2 | 2 | 2 | 2 | 2 |
| Thickenss | µm | 50 | 50 | 50 | 50 | 50 | 50 |
| Thickness of Laminated Film by Blocking | µm | 100 | 100 | 100 | 100 | 100 | 100 |
| Adhesive Layer Thickness | µm | — | — | — | — | 15 | 15 |
| Laminated Flexible Sheet | | | | | | | |
| Kind | — | — | — | — | — | Al metallized biaxially stretched polyester resin film | KOP film |
| Thickness | µm | — | — | — | — | 10 | 20 |
| Young's Modulus | kg/mm$^2$ | — | — | — | — | 218 | 210 |
| Melting Point | °C. | — | — | — | — | 260 | 120 |
| Heat Sealing Layer Thickness | µm | — | — | — | — | — | — |
| Separation at Cut End Portion | — | None | None | None | None | None | None |
| Wrinkling, Streaks, Blister | — | None | None | None | None | None | None |
| Resistance to Pinholes | — | Very Excellent A | Very Excellent A | Very Excellent A | Very Excellent A | Very Excellent A | Very Excellent A |

| | Example 9 | Example 10 | Comparative 2 | Comparative 3 | Test Method |
|---|---|---|---|---|---|
| Layer Construction | FIG. 12 | FIG. 11 | Similer to FIG. 9 | Similer to FIG. 9 | — |

TABLE 1-continued

| | | | | | |
|---|---|---|---|---|---|
| Inner Layer | | | | | |
| Thickness | 25 | 40 | 25 | 25 | JIS P-8118 |
| Shore Hardness | 52 | 52 | 63 | 57 | ASTM D-2240 |
| Vicat Softening point | 92 | 92 | 116 | 108 | ASTM D-1525 |
| Outer Layer | | | | | |
| Thickness | 25 | 10 | 25 | 25 | JIS P-8118 |
| Shore or Rockwell Hardness | 63 | — | 52 | 63 | ASTM D-785 |
| | — | 115 | — | — | |
| Vicat Softening point | 116 | 198 | 92 | 116 | ASTM D-1525 |
| Inflation Film | | | | | |
| Number of Layers | 2 | 2 | 2 | 2 | — |
| Thickenss | 50 | 50 | 50 | 50 | JIS P-8118 |
| Thickness of Laminated Film by Blocking | 100 | 100 | 100 | 100 | JIS P-8118 |
| Adhesive Layer Thickness | 15 | — | — | — | JIS P-8118 |
| Laminated Flexible Sheet | | | | | |
| Kind | Al metallized biaxially stretched nylon resin film | — | — | — | — |
| Thickness | 15 | — | — | — | JIS P-8118 |
| Young's Modulus | 246 | — | — | — | ASTM D-882 |
| Melting Point | 220 | — | — | — | DSC Method |
| Heat Sealing Layer Thickness | — | 30 | — | — | JIS P-8118 |
| Separation at Cut End Portion | None | None | No automatic bag-making | No automatic bag-making | |
| Wrinkling, Streaks, Blister | None | None | Occur | Occur | *1 |
| Resistance to Pinholes | Very Excellent A | Very Excellent A | Cannot tested | Cannot tested | *2 |

*1 Examined by making three-sided fin seal bags using the central roll 34 of FIG. 30 where both ends of the web were slitted and heat fused.
*2 50 sheets of photographic films were covered by a V-shaped pad made of paper board, and put in the above three-sided fin seal bag. The opening of the bag was sealed, and put in a fitting type decorated box. 10 boxes of the decorated box were put in a corrugated board box, and shaking test was conducted according to JIS Z-0322. Pinholes were inspected by visual observation.

Example 11

A laminated film of which the inner surface is joined by blocking with strongly joined portions and weakly joined portions, illustrated in FIGS. 2 and 18, was prepared from a coextruded double layer inflation film.

The outer layer was an ethylene-α-olefin copolymer resin layer composed of 70 wt. % of ethylene-octene-1 copolymer resin having a MI of 2.0 g/10 minutes, a density of 0.918 g/cm$^3$ and a Vicat softening point of 109° C. 26.6 wt. % of ethylene-4-methylpentene-1 copolymer resin having a MI of 2.1 g/10 minutes, a density of 0.940 and a Vicat softening point of 127° C., 3 wt. % of BaSO$_4$, 0.3 wt. % of dimethylpolysiloxane having a viscosity of 10,000 centistokes and 0.1 wt. % of 5,8-dimethyl-tocotrienol, 0.3 wt. % of calcium stearate and 0.1 wt. % of 2,6-di-t-butyl-paracresol, and had a thickness of 20 μm.

The inner layer was a low softening point ethylene-butene-1 resin layer composed of 80 wt. % of ethylene-butene-1 copolymer resin having a MI of 1.8 g/10 minutes, a density of 0.907 g/cm$^3$ and a Vicat softening point of 86° C., 10 wt. % of graft-modified resin of unsaturated carboxylic acid and EVA resin ("Adhesive EVA Resin MODIC E-200 H", Mitsubushi Petrochemical Ind.) having a MI of 2.5 g/10 minutes, a density of 0.94 g/cm$^3$ and a Vicat softening point of 66° C., 0.5 wt. % of glycerine monostearate, 2 wt. % of carbon black, 0.2 wt. % of 5,8-dimethyl-tocotrienol and 7.3 wt. % of low molecular weight polyethylene wax, and had a thickness of 10 μm.

The outer layer of the above coextruded double layer inflation film 30 μm in thickness was cooled by air-cooling blown from an air ring, and the inner layer was weakly joined by blocking by passing a nip roll. Then, the laminated film joined weakly by blocking was passed a pressing apparatus composed a metal embossing roll having longitudinal ribs 30 μm in height 5 mm in width at 3 mm intervals heated at 80° C. and a silicone rubber pressure roll which is the heat-resistant elastic roll to obtain a laminated film 60 μm in thickness joined by blocking with strongly joined longitudinal streaks having a four layer construction.

The laminated film was excellent in physical strength, particularly tear strength and Gelbo test strength, heat sealing properties, such as heat seal strength, hot tack properties, sealability with other materials, heat seal strength with time and low temperature heat seal strength with time, X-ray shielding ability, antistatic ability and film moldability, and separation problems between the inner layers occurring in the lamination process to other flexible sheet and in the bag-making proces resulting in the occurrence of wrinkling, streaks and blistering could be prevented without using adhesive. Since the production of the laminated film was conducted in the coextruded double layer inflation film molding process, a plurality of laminated multilayer rolls could be produced by slitting the laminated film into the width of use by the inexpensive slitting method using the heated razor blade heated by electric resistance to around the Vicat softening point without the occurrence of separation, wrinkling, streaks, blistering, etc. (FIG. 34). Light-shielding laminated multilayer films having the light-shielding ability equal to the conventional laminated film could be produced by using a combination of 5,8-dimethyl-tocotrienol having antioxidation action and the effect upon the improvement in light-shielding ability and dimethylpolysiloxane of which the viscosity was 10,000 centistokes having the effect upon the improvement in film moldability, resin fluidity, antiblocking and light-shielding ability due to the increase of haze, even though the amount of light-shielding material was decreased by 30%. As a result, various unexpected results were obtained, such as the improvement in heat sealing properties, physical strength, dustproofness, appearance (the decrease of the production of insoluble lumps), slipping character, etc. By blending antistatic agent of glycerine monostearate into the inner layer, electrification of the laminated multilayer film composed of thermoplastic resin layers alone was prevented, and moreover, the degradation of heat sealing properties, the development inhibition by the adhesion of white powder onto the photosensitive layer of photographic photosensitive materials and the like, due to the bleeding out of additives.

Example 12

A laminated film of which the inner surface is joined by blocking with strongly joined portions and weakly joined portions, illustrated in FIG. 20 and similar to FIG. 8 was prepared from a coextruded triple layer inflation film.

The outer layer was a nylon 6 resin layer 10 μm in thickness composed of the polyamide resin alone.

The middle layer was a modified L-LDPE resin layer 5 μm in thickness composed of L-LDPE type adhesive resin modified by graft polymerization of unsaturated carboxylic acid ("Admer NF 300", Mitsui Petrochemical Ind.) having a MI of 1.3 g/10 minutes, a density of 0.94 g/cm$^3$ and a Vicat softening point of 100° C. containing 3 wt. % of carbon black.

The inner layer was a light-shielding polyolefin resin layer 25 μm in thickness composed of 60 wt. % of ethylene-butene-1 copolymer resin having a MI of 1.2 g/10 minutes, a density of 0.893 g/cm$^3$ and a Vicat softening point of 83° C., 35 wt. % of high pressure branched low density homopolyethylene (LDPE) resin having a MI of 5.6 g/10 minutes, a density of 0.918 g/cm$^3$ and a Vicat softening point of 87° C., 4.5 wt. % of carbon black, 0.3 wt. % of zinc stearate and 0.2 wt. % of a phenol antioxidant ("Irganox 1010", Ciba-Geigy).

The inner surface of the above coextruded triple layer inflation film 40 μm in thickness was joined weakly by blocking by passing it through a nip roll, and then strongly joined lateral streaks were formed by passing a pressing apparatus with an embossing roll to obtain a laminated film 80 μm in thickness with strongly joined portions having a six layer construction.

A heat sealing layer 30 μm in thickness was provided on one side of the laminated film by coating directly the resin composition composed of 60 wt. % of LDPE resin having a MI of 5.1 g/10 minutes and a density of 0.919 g/cm$^3$, 27 wt % of ethylene-butene-1 copolymer resin having a MI of 1.2 g/10 minutes and a density of 0.920 g/cm$^3$, 10 wt % of unsaturated carboxylic acid-modified L-LDPE resin ("Admer NB 050", Mitsui Petrochemical Ind.) having a MI of 3.5 g/10 minutes and a density of 0.93 g/cm$^3$ and 3 wt. % of carbon black by the extrusion laminating method at the resin temperature of 310° C.

Example 13

The coextruded triple layer inflation film having the same thickness and resin composition as Example 12 was used. Longitudinal ribs were formed on the inner surface of the inflation film by using a stainless steel cooling apparatus for keeping film width cooled by water at 20° C. on the surface of which longitudinal ribs were formed at 2.5 mm intervals, while the outer layer of the inflation film was air-cooled. Then, the inner surface was joined at 10 mm intervals by an embossing pressing apparatus having lateral ribs.

On the laminated film 80 μm in thickness having a six layer construction, a heat sealing layer 30 μm in thickness having the same resin composition as Example 12 was coated by the same method.

The inner layer of the laminated film thus obtained had ribs in the longitudinal direction, and the outer layer had ribs in the lateral direction, in total having a lattice structure. The laminated film was excellent in physical strength, resistance to pinholes, Gelbo test strength, wear resistance of the outer layer, and the like, and the cost was sharply reduced. This laminated film was particularly suitable as the light-shielding bag for photographic photosensitive materials.

Particularly, the laminated films of Examples 12 and 13 are suitable as the light-shielding bag for packaging heavy photographic photosensitive materials in the form of a roll or sheets having sharp edges, which is excellent in physical strength, resistance to pinholes, oxygen barrier, heat sealing properties, and low cost.

Example 14

A laminated film wherein the end portions are joined more strongly than the central portion was prepared. The layer construction corresponds to FIG. 22.

A single layer inflation film 50 μm in thickness 150 cm in lay-flat width was molded of the polyolefin resin composition composed of 40 wt. % of ethylene-4-methylpentene-1 copolymer resin having a MI of 2.0 g/10 minutes and a density of 0.930 g/cm$^3$, 20 wt % of ethylene-butene-1 copolymer resin having a MI of 1.2 g/10 minutes and a density of 0.90 g/cm$^3$, 26.8 wt % of LDPE resin having a MI of 5.4 g/10 minutes and a density of 0.918 g/cm$^3$, 10 wt. % of acid-modified L-LDPE resin, 0.2 wt. % of a dibenzilidenesorbitol organic nucleating agent and 3 wt. % of carbon black coated with calcium stearate, using an inflation film molding machine at the resin temperature of 190° C. at the blow-up ratio of 1.2. After air-cooling, the inner layer of the inflation film was joined over the whole surface weakly by blocking by heating using an infrared heater immediately before an nip roll and by passing the nip roll so that the peeling strength was 3 g/15 mm width. Then, using the apparatus shown in FIG. 34, the inflation film was provided with two strongly joined lines 30 mm in width with an oblique lattice pattern by passing the embossing rolls heated at 120° C. so that the peeling strength was 550 g/15 mm width, and the strongly joined portions were slit by a heated razor blade at 90° C. into three webs 50 cm in width.

Example 15

A laminated film corresponding to FIG. 25 was prepared.

The outer layer was 25 μm in thickness and composed of 40 wt. % of ethylene-octene-1 copolymer resin having a MI of 2.1 g/10 minutes and a density of 0.920 g/cm$^3$, 40 wt. % of ethylene-4-methylpentene-1 copolymer resin having a MI of 3.1 g/10 minutes and a density of 0.940 g/cm$^3$, 10 wt % of acid-modified ethylene-4-methylpentene-1 copolymer resin, 3 wt. % of oil furnace carbon black of which the surface was treated with erucic amide and 0.05 wt. % of a phenol antioxidant.

The inner layer 25 μm in thickness was composed of the same resin composition as Example 14 except that EVA resin was used instead of LDPE resin.

The coextruded double layer inflation film composed of the above outer and inner layers 180 cm in lay-flat width was molded using an inflation film molding machine at the outer layer resin temperature of 200° C. and the inner layer resin temperature of 180° C. at the blow-up ratio of 1.5. After air-cooling, the inner layer of the inflation film was joined over the whole surface weakly by blocking by passing the nip roll so that the peeling strength was 12 g/15 mm width. Then, using the apparatus shown in FIG. 34, the inflation film was provided with two strongly joined lines 30 mm in width with an oblique lattice pattern by passing the embossing rolls heated at 80° C. so that the peeling strength was 75 g/15 mm width, and the strongly joined portions were slit by a heated razor blade at 100° C. into three webs 60 cm in width.

Example 16

A laminated film corresponding to FIG. 27 was prepared.

An aluminum (400 Å) metallized biaxially stretched polyester resin film 12 μm in thickness was laminated onto the laminated film of Example 15 through an adhesive layer 15 μm in thickness composed of 60 wt. % of LDPE resin and 40 wt. % of ethylene-butene-1 copolymer resin provided by extrusion laminating at the resin temperature of 320° C.

Light-shielding bags made of the laminated film were excellent in sealability, light-shielding ability, physical strength, moistureproofness, gas barrier, resistance to pinholes, heat sealing properties, such as heat seal strength, hot tack properties, heat seal strength with time, appearance, and the like.

Example 17

The coextruded double layer inflation film used was 70 μm in thickness, 120 cm in lay-flat width and composed of the outer layer 20 μm in thickness composed of 20 wt. % of homopolyethylene resin having a MI of 2.1 g/10 minutes, a density of 0.960 g/cm$^3$ and a softening point of 128° C., 72.75 wt. % of ethylene-octene-1 copolymer resin having a MI of 1.5 g/10 minutes, a density of 0.920 g/cm$^3$ and a Vicat softening point of 103° C., 6 wt. % of titanium dioxide in anatase form of which the surface was treated with water-containing aluminum oxide, 0.05 wt. % of a phenol antioxidant and 0.2 wt. % of a dibenzylidenesorbitol compound and the inner layer 15 μm in thickness composed of 70 wt. % of ethylene-butene-1 copolymer resin having a MI of 2.0 g/10 minutes, a density of 0.90 g/cm$^3$ and a Vicat softening point of 83° C. and 30 wt. % of LDPE resin having a MI of 3.8 g/10 minutes, a density of 0.920 g/cm$^3$ and a Vicat softening point of 89° C. The inner layer of the inflation film was joined over the whole surface weakly by blocking by passing the nip roll so that the peeling strength was 15 g/15 mm width. The central portion of the laminated film was strongly joined by blocking 2 cm in width by passing a heating pressure roll at 80° C. so that the peeling strength was 93 g/15 mm width, and the strongly joined portion was slit by a heated razor blade at 100° C. into two webs 60 cm in width. A polyvinylidene chloride-coated biaxially stretched polypropylene resin film with printing was laminated onto the above laminated film through an extrusion laminated adhesive layer 15 μm in thickness composed of LDPE resin containing 15 wt. % of acid-modified LDPE resin so that the printed side faced the laminated film.

Example 18

The inflation film used was a polyolefin resin film 50 μm in thickness containing carbon black was composed of 5 wt. % of homopolyethylene resin having a MI of 1.1 g/10 minutes and a density of 0.954 g/cm$^3$, 87 wt. % of ethylene-4-methylpentene-1 copolymer resin having a MI of 2.1 g/10 minutes and a density of 0.920 g/cm$^2$, 4.5 wt. % of LDPE resin having a MI of 2.4 g/10 minutes and a density of 0.923 g/cm$^3$, 3 wt. % of oil furnace carbon black having a mean particle size of 21 mμ, 0.05 wt. % of erucic amide and 0.1 wt. % of antioxidant, and the softening point was 102° C. The inflation film was deflated by passing a nip roll, and both edges were slit by using the cutting apparatus shown in FIG. 35. The razor blade was heated to 88° C., and the winding speed of each roll was adjusted to 30 m/min. Since both blades were heated as the whole, local temperature elevation caused by friction with the film was inhibited, and they softened the film. As a result, the sharpness of the blade was kept after continuous slitting for 240 hours. Then, further film could be slit without changing the blade. The cut end portion was melted by the heat of blade, and cuttings and carbon powder adhered to the melted cut end portion. Therefore, the scattering of cuttings and carbon powder were very small. Since the cut end was thickened, the tear strength in the longitudinal direction was 807 g and that in the lateral direction was 1,040 g. As a result, film rupture did not occur through the film molding process and the laminating process to laminate other flexible sheet. On the other hand, when the blades were used without heating at 25° C., the sharpness of the blades was degraded, and they were necessary to be changed after continuous cutting for 38 hours.

Example 19

The inflation film used was a polyolefin resin film 100 μm in thickness containing carbon black was composed of 96.8 wt. % of LDPE resin having a MI of 3.2 g/10 minutes and a density of 0.922 g/cm$^3$, 3 wt. % of oil furnace carbon black having a mean particle size of 21 mμ, 0.05 wt. % of oleic amide, 0.1 wt. % of a phenol antioxidant, 0.05 wt. % of zinc stearate and 0.05 wt. % of synthetic silica, and the softening point was 92° C. The inflation film was deflated by passing a nip roll, and both edges were slit by using the cutting apparatus shown in FIG. 35. The razor blade was heated to 77° C. and the winding speed of each roll was adjusted to 25 m/min. As a result, the sharpness of the blade was maintained after continuous slitting for 240 hours. Since the cut end portion was melted by the heat of blade, the scattering of cuttings and carbon powder were very small. The cut end was thickened, and the tear strength in the longitudinal direction was 211 g and that in the lateral direction was 895 g. As a result, film rupture did not occur through the film molding process and the laminating process to laminate other flexible sheet. On the other hand, when the blades were used without heating, the sharpness of the blades was degraded, and it was necessary for them to be changed after continuous cutting for 68 hours.

Example 20

The inflation film used was a coextruded double layer inflation film of which the outer layer 25 μm in thickness was composed of 76.6 wt. % of ethylene-4-methylpentene-1 copolymer resin having a MI of 2.1 g/10 minutes and a density of 0.920 g/cm³, 20 wt. % of homopolyethylene resin having a MI of 1.1 g/10 minutes, a density of 0.954 g/cm³ and a Vicat softening point of 126° C., 3 wt. % of oil furnace carbon black having a mean particle size of 21 mμ, 0.1 wt. % of oleic amide, 0.2 wt. % of calcium stearate and 0.1 wt. % of antioxidant, and had a softening point of 113° C. The inner layer 25 μm in thickness was composed of 92.4 wt. % of ethylene-4-methylpenetene-1 copolymer resin having a MI of 2.0 g/10 minutes and a density of 0.920 g/cm³, 4.5 wt. % of LDPE resin having a MI of 2.4 g/10 minutes and a density of 0.923 g/cm³, 3 wt. % of oil furnace carbon black and 0.1 wt. % of antioxidant, and had a softening point of 98° C.

The inflation film was deflated, and the inner layer was joined by blocking. The lay-flat width was 1,500 mm, and the thickness was 100 μm. The inflation film was slit into three webs by using the cutting apparatus of FIG. 30. The razor blade was heated to 98° C., and the winding speed of each roll was adjusted to 15 m/min. As a result, both blades kept their sharpness after continuous slitting for 240 hours, and further film could be slit without changing the blade. The cut end portion was melted by the heat of blade and cuttings did not generate. The cut end portion was thickened, and both the tear strength in the longitudinal direction and that in the lateral direction were more than 1,600 g. The cut end portions were melted and formed heat fused portions, and the slit laminated films had the aforementioned superiorities of the laminated film joined by blocking wherein the cut end portion forms a heat fused portion. On the other hand, when the blades were used without heating at 25° C., the sharpness of the blades was degraded, and it was necessary for them to be changed after continuous cutting for 26 hours.

Example 21

The inflation film used was a coextruded double layer inflation film of which the outer layer 25 μm in thickness was composed of 76.6 wt. % of ethylene-4-methylpentene-1 copolymer resin having a MI of 2.1 g/10 minutes, a density of 0.920 g/cm³ and a Vicat softening point of 100° C., 20 wt. % of HDPE resin having a MI of 1.1 g/10 minutes, a density of 0.954 g/cm³ and a Vicat softening point of 126° C., 3 wt. % of oil furnace carbon black having a mean particle size of 21 mμ, 0.05 wt. % of oleic amide, 0.1 wt. % of antistatic agent and 0.05 wt. % of antioxidant, and had a Vicat softening point of 108° C. The inner layer 25 μm in thickness was composed of 70 wt. % of ethylene-4-methylpentene-1 copolymer resin having a MI of 2.0 g/10 minutes, a density of 0.922 g/cm³ and a Vicat softening point of 102° C. and 4.5 wt. % of very low density polyethylene resin having a MI of 1.2 g/10 minutes, a density of 0.892 g/cm³ and a Vicat softening point of 76° C. The inner layer was joined by blocking by heating by an inflation heater provided before a nip roll and pressing by the nip roll so that the peeling strength was 5 g/15 mm width. The inflation film 100 μm in thickness was slit into three webs by using the cutting apparatus of FIG. 30. The razor blade was heated to 102° C., and the winding speed of each roll was adjusted to 15 m/min. As a result, both blades kept their sharpness after continuous slitting for 200 hours. The cut end portion was melted by the heat of blade and cuttings did not generate. The cut end portion was thickened, and both the tear strength in the longitudinal direction and that in the lateral direction were more than 1,600 g. The peeling strength of the cut end portions were 8 g/15 mm width and 7.5 g/15 mm width which were greater than the other parts of which the peeling strength was 5 g/15 mm width. The laminated film did not separate from the cut end portion through the film forming process and the laminating process. On the other hand, when the blades were used without heating at 25° C., the sharpness of the blades was degraded, and it was necessary that they changed after continuous cutting for 22 hours. By providing the ion sputterer, the electric potential of the film was reduced to less than 50 V, less than one third of the film not provided with the ion sputterer. A electric shock was not experienced by touching the film by hand. The adhesion of dust and cutting were rarely obserbed.

In the case of slitting a laminated film 100 μm in thickness composed of a coextruded double layer inflation film made of an ethylene-α-olefin copolymer resin containing carbon black of which the inner layer was joined by blocking which had a very great tear strength of more than 1,600 g in the longitudinal direction, the continuous slitting time was 240 hours by using the heated razor blade at about 100° C. When the blade was not heated, the continuous slitting time was 26 hours.

In the case of slitting a polyolefin resin film containing carbon black having a tear strength particularly in the longitudinal direction smaller than the above coextruded double layer inflation film of ethylene-α-olefin copolymer resin, such as a film of LDPE resin having a MI of 2.4 g/10 minutes and a density of 0.924 g/cm³ containing 3 wt. % of carbon black of which the tear strength in the longitudinal direction was 53 g less than 1/30, the continuous slitting could be more than 360 hours.

The resins suitable for the slitting by the heated razor blade are various thermoplastic resin films, such as polyolefin resin films, polyamide resin films, cellulose triacetate films, polystyrene resin films, synthetic papers and polycarbonate resin films, and the slittable life can be lengthened.

We claim:

1. A laminated film comprising an inflation film of which the inner surface is joined by blocking and having a cut end that is joined by heat fusion and which has a peel strength greater than the peel strength of the portion joined by blocking.

2. The laminated film of claim 1 wherein the inflation film comprises an outer layer and an inner layer having a softening point lower than the outer layer.

3. A laminated film comprising a coextruded multilayer inflation film of which the inner surface is joined by blocking, wherein the Shore hardness of the thermoplastic resin comprising the inner layer is 10 to 60 D and is lower than the thermoplastic resin comprising the outer layer by at least 2 D.

4. A laminated film comprising a coextruded multilayer inflation film of which the inner surface is joined by blocking, wherein the inner layer comprises 5 to 80 wt. % of an acid-modified polyolefin resin modified by grafting 0.01 to 10% of an unsaturated carboxylic acid compound.

5. The laminated film of claim 1, 2, 3, or 4 wherein the outer layer has a Vicat softening point higher than the inner layer and heat sealability.

6. The laminated film of claim 1, 2, 3, or 4 wherein a heat-resistant flexible sheet having a Young's modulus of not less than 50 kg/mm² and a melting point of higher than 100° C. or no melting point is laminated directly or through an adhesive layer.

7. The laminated film of claim 1, 2, 3, or 4 wherein a heat sealing layer having a Vicat softening point lower than the outer layer is laminated directly or through an adhesive layer.

8. A laminated film comprising two thermoplastic resin films of which the inner surfaces are joined by blocking comprising strongly joined portions and weakly joined portions, wherein the strongly joined portions have a peel strength of 2 to 250 g/15 mm width, and are greater than the weakly joined portions.

9. The laminated film of claim 8 wherein the laminated film is made of a deflated inflation film.

10. The laminated film of claim 8 or 9 wherein the peeling strength of the strongly joined portion is not less than twice that of the weakly joined portion.

11. The laminated film of claim 8 or 9 which contains a light-shielding material having a content in total of cyanides and sulfur components of less than 1%, said light-shielding material being in at least two layers.

12. The laminated film of any of claim 1, 2, 3, 4, 8 or 9 wherein the outer layer contains at least one dimethylpolysiloxane or modified dimethylpolysiloxane having a viscosity of 50 to 100,000 centistokes in an amount of 0.01 to 2.5 wt. %.

13. The laminated film of any of claims 1, 2, 3, 4, 8, or 9 wherein the peel strength of strongly joined portions is not less than 50 g/15 mm width and the peel strength of weakly joined portions is not more than 50 g/15 mm width.

14. The laminated film of claim 8 or 9 wherein the peel strength of the strongly joined portion is not less than 20 g/15 mm width, the peel strength of the weakly joined portion is not more than 50 g/15 mm width, and the peel strength of the strongly joined portion is greater that the weakly joined portion.

15. The laminated film of any of claims 1, 2, 3, 4, 8, 9 wherein the inner layer contains not less than 5 wt. % of very low density L-LDPE resin having a density of less than 0.910 g/cm$^3$.

16. The laminated film of any of claims 1, 2, 3, 4, 8, 9 wherein the outer layer contains more than 3 wt. % of L-LDPE resin having a density of more than 0.920 g/cm$^3$.

17. The laminated film which is laminated by blocking and having end portions which have a peel strength of not less than 50 g/15 mm width and are joined more strongly than a central portion which has a peel strength of not more than 50 g/15 mm width.

* * * * *

UNITED STATES PATENT AND TRADEMARK OFFICE
CERTIFICATE OF CORRECTION

PATENT NO. : 5,358,785

DATED : October 25, 1994

INVENTOR(S) : Mutsuo AKAO et al

It is certified that error appears in the above-indentified patent and that said Letters Patent is hereby corrected as shown below:

On the title page, item [75], delete "Koji Nakai, Shiozuoka, all of"

Signed and Sealed this

Sixth Day of December, 1994

Attest:

BRUCE LEHMAN

Attesting Officer

Commissioner of Patents and Trademarks